(12) United States Patent
Mineno et al.

(10) Patent No.: US 9,098,360 B2
(45) Date of Patent: Aug. 4, 2015

(54) PROGRAM, INFORMATION PROCESSING APPARATUS, AND EVENT PROCESSING METHOD

(71) Applicant: Fujitsu Limited, Kawasaki-shi, Kanagawa (JP)

(72) Inventors: Kazuo Mineno, Inagi (JP); Toshiya Hanamori, Shizuoka (JP); Toshihiro Nishimura, Hachioji (JP); Masaharu Koyabu, Mishima (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/517,054

(22) Filed: Oct. 17, 2014

(65) Prior Publication Data
US 2015/0040144 A1 Feb. 5, 2015

Related U.S. Application Data

(63) Continuation of application No. PCT/JP2012/060782, filed on Apr. 20, 2012.

(51) Int. Cl.
*G06F 13/00* (2006.01)
*G06F 9/54* (2006.01)
*G06F 17/30* (2006.01)

(52) U.S. Cl.
CPC .......... *G06F 9/542* (2013.01); *G06F 17/30979* (2013.01)

(58) Field of Classification Search
CPC .............. G06F 9/542; H04L 29/08072; H04L 41/0213
USPC .................................. 719/318; 709/223, 224
See application file for complete search history.

(56) References Cited

U.S. PATENT DOCUMENTS 6,920,468 B1 * 7/2005 Cousins et al. ........ 707/999.006
7,689,994 B2 * 3/2010 Vronay et al. ................ 718/103
(Continued)

FOREIGN PATENT DOCUMENTS

JP 8-6798 1/1996
JP 2009-251780 10/2009
(Continued)

OTHER PUBLICATIONS

Patent Abstracts of Japan, Publication No. 08-006798, published Jan. 12, 1996.
(Continued)

*Primary Examiner* — Andy Ho
(74) *Attorney, Agent, or Firm* — Staas & Halsey LLP

(57) ABSTRACT

A storage unit stores rule information that includes information indicating a plurality of operations based on event data. A computing unit searches the rule information to find information indicating a first operation, information indicating an operation of a condition determination that is executable regardless of the result of the first operation, and information indicating a second operation that is associated with the condition determination and uses the result of the first operation. The computing unit generates control information for controlling the execution order of the operations such that the first operation is executed in accordance with the result of the condition determination and such that the second operation is executed after the first operation. When the event data is input, the computing unit executes an operation corresponding to the input event data, based on the control information.

13 Claims, 34 Drawing Sheets

(56) References Cited

U.S. PATENT DOCUMENTS

| | | | |
|---|---|---|---|
| 8,020,045 B2 * | 9/2011 | Morimura et al. | 714/26 |
| 2009/0252175 A1 | 10/2009 | Dempo | |
| 2011/0088035 A1 | 4/2011 | Etzion et al. | |

FOREIGN PATENT DOCUMENTS

| | | |
|---|---|---|
| JP | 2011-86288 | 4/2011 |
| JP | 2012-79240 | 4/2012 |
| WO | WO 2008/150675 A1 | 12/2008 |
| WO | WO 2009/140363 A1 | 11/2009 |

OTHER PUBLICATIONS

Patent Abstracts of Japan, Publication No. 2009-251780, published Oct. 29, 2009.

Patent Abstracts of Japan, Publication No. 2011-086288, published Apr. 28, 2011.

Patent Abstracts of Japan, Publication No. 2012-079240, published Apr. 19, 2012.

International Search Report mailed Jun. 5, 2012, in corresponding International Patent Application No. PCT/JP2012/060782.

* cited by examiner

EXAMPLE OF OUTPUT EVENT DATA    300

| Event Type | id | Data |
|---|---|---|
|  |  |  |
| A | 0021 | 20 (°C) |

| Home Table | | | | | |
|---|---|---|---|---|---|
| id | power | aircon | maxpow | name | area |
| 0001 | 0011 | 0021 | 1500 | user1 | Tokyo |
| 0002 | 0012 | 0022 | 2000 | user2 | Yokohama |

EXAMPLE OF DEFINITION RULE    112a

| d1 | P(id, pow); |
|---|---|
| d2 | A(id, temp); |
| d3 | Home(id, power, aircon, maxpow, name, area); |
| d4 | Window Home.pow; |
| d5 | Select * From P, Home Where P.id = Home.power; |
| d6 | Select * From A, Home Where A.id = Home.aircon; |

FIG. 10

EXAMPLE OF PROCESSING RULE                    112b r1  IF P.pow > 500 THEN Set P.Home.pow = P.pow;

r2  IF A.temp > 25 THEN Send A.msg = "Lowering the temperature setting will reduce power consumption";

r3  IF A.temp > 20 AND A.temp <= 25 AND A.Home.pow > A.Home.maxpow
       THEN Cont A.temp-=2;

| | | Definition Rule Management Table | |
|---|---|---|---|
| No. | Type | Name | Included Items |
| d1 | Event | P | P.id, P.pow |
| d2 | Event | A | A.id, A.temp |
| d3 | External Table | Home | Home.id, Home.power, Home.aircon, Home.maxpow, Home.name, Home.area |
| d4 | Window | Home.pow | Home.pow |
| d5 | JOIN Result | P.Home | P.id, P.pow, P.Home.id, P.Home.aircon, P.Home.maxpow, P.Home.name, P.Home.area |
| d6 | JOIN Result | A.Home | A.id, A.temp, A.Home.id, A.Home.power, A.Home.maxpow, A.Home.name, A.Home.area |

FIG. 12

Control Table 114

| No. | Pre-Filter | JOIN | After-Filter | Status (Window) | Main Operation |
|---|---|---|---|---|---|
| r1 | P.pow > 500 | Select * From P, Home Where P.id = Home.power; | — | Home.pow | Set P.Home.pow = P.pow |
| r2 | A.temp > 25 | — | — | — | Send A.msg = "..." |
| r3 | A.temp > 20<br>A.temp <= 25 | Select * From A, Home Where A.id = Home.aircon; | A.Home.pow ><br>A.Home.maxpow | Home.pow | Cont A.temp-=2 |

FIG. 13

Control Table 114a

| No. | Pre-Filter | JOIN | After-Filter | Status (Window) | Main Operation |
|---|---|---|---|---|---|
| r1 | P.pow > 500 | Select Home.id From P, Home Where P.id = Home.power; | — | Home.pow | Set Home.pow = P.pow |
| r2 | A.temp > 25 | — | — | — | Send A.msg = "..." |
| r3 | A.temp > 20 A.temp <= 25 | Select Home.id Home.maxpow From A, Home Where A.id = Home.aircon; | Home.pow > Home.maxpow | Home.pow | Cont A.temp-=2 |

FIG. 14

| r4 | IF X=A AND (Y=B OR Z=C) THEN SET W=A; |
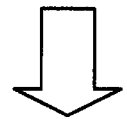
| r5 | IF (X=A AND Y=B) OR (X=A AND Z=C) THEN SET W=A; |
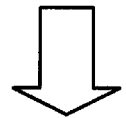
| r6 | IF X=A AND Y=B THEN SET W=A; |
| r7 | IF X=A AND Z=C THEN SET W=A; |
FIG. 17

COMPARATIVE EXAMPLE OF RULE SET (NO. 1)    115

| | |
|---|---|
| r101 | IF P THEN Select * From P, Home Where P.id = Home.power; |
| r102 | IF A THEN Select * From A, Home Where A.id = Home.aircon; |
| r103 | IF P.pow > 500 THEN Set P.Home.pow = P.pow; |
| r104 | IF A.temp > 25 THEN Send A.msg = "Lowering the temperature setting will reduce power consumption"; |
| r105 | IF A.temp > 20 AND A.temp <= 25 AND A.Home.pow > A.Home.maxpow     THEN Cont A.temp-=2; |

FIG. 21

COMPARATIVE EXAMPLE OF RULE SET (NO. 2)　　　116

| | |
|---|---|
| r111 | create schema P(id string, pow int); |
| r112 | create schema A(id string, temp int); |
| r113 | create window HomePowerWindow.std:unique(homeId)(homeId string, pow int); |
| r114 | insert into HomePowerWindow<br>　　select h.Home as homeId, p.pow as pow from P as ps unidirectional,<br>　　　　sql:HomeDB['select Home from DB where Power=$[ps.id]' ] as h,<br>　　　　　P(pow>500) as p; |
| r115 | select id, "Lowering the temperature setting will reduce power consumption" as msg from A(temp>25); |
| r116 | select a.id, a.temp-2 as temp from A as a unidirectional,<br>　　sql:HomeDB['select Home, Maxpow from DB where Aircon=$[a.id]' ] as h,<br>　　HomePowerWindow as hpw<br>　　　　where hpw.homeId=h.Home and a.temp>20 and a.temp<=25<br>　　　　　and hpw.pow>h.Maxpow; |

FIG. 22

Event Count Table 400

| Event | Distribution | % | Input | Pre-Filter | JOIN | After-Filter | Main Operation | Exit Operation |
|---|---|---|---|---|---|---|---|---|
| Event P (1,000,000 events/sec) | pow>1500(Wh) | 10 | 100,000 | 100,000 (r1) | 100,000 (r1) | — | 100,000 (r1) | — |
| | pow>500(Wh) pow<=1500(Wh) | 20 | 200,000 | 200,000 (r1) | 200,000 (r1) | — | 200,000 (r1) | — |
| | pow<=500(Wh) | 70 | 700,000 | 0 | — | — | — | — |
| Event A (1,000,000 events/sec) | temp>25(°C) | 10 | 100,000 | 100,000 (r2) | — | — | 100,000 (r2) | 100,000 (r2) |
| | temp>20(°C) temp<=25(°C) | 20 | 200,000 | 200,000 (r3) | 200,000 (r3) | 20,000 (r3) | 20,000 (r3) | 20,000 (r3) |
| | temp<=20(°C) | 70 | 700,000 | 0 | — | — | — | — |
| Total (2,000,000 events/sec) | — | — | 2,000,000 | 600,000 | 500,000 | 20,000 | 420,000 | 120,000 |
| Comparative Example (Rule allocation not performed) | | | 2,000,000 | 2,000,000 (JOIN) | | | 2,000,000 | 120,000 |

FIG. 23

EXAMPLE OF RULE STRUCTURE
500

```
1  struct rule{
2      char *rule;
3      char *type;
4      char *item;
5      RULE *to;
6      VALUE value[ ];
7  }RULE;
```

FIG. 24

EXAMPLE OF VALUE STRUCTURE

```
1  struct value{
2      char *v;
3      void *p;
4  }VALUE;
```

501

FIG. 25

PROGRAM, INFORMATION PROCESSING APPARATUS, AND EVENT PROCESSING METHOD

CROSS-REFERENCE TO RELATED APPLICATION

This application is a continuation application of International Application PCT/JP2012/060782 filed on Apr. 20, 2012 which designated the U.S., the entire contents of which are incorporated herein by reference.

FIELD

The present invention relates to a program, an information processing apparatus, and an event processing method.

BACKGROUND

Information processing systems including various apparatuses connected to an information processing apparatus via a network are now used. In some of these information processing systems, an information processing apparatus executes an operation corresponding to an event record received from any of the other apparatuses. The apparatuses that issue event records include a wide variety of apparatuses such as, for example, other information processing apparatuses, sensor devices, home appliances, and the like.

A rule defining the content of a condition used by the information processing apparatus for determining whether to execute an operation for an event record and defining the content of the operation is created in advance by the user, for example. When the information processing apparatus determines that the condition described in the rule is satisfied upon receipt of event data, the information processing apparatus executes the corresponding operation. The information processing apparatus sometimes executes one or more operations based on multiple event records sequentially received from the various apparatuses. This method of executing operations is often called Complex Event Processing (CEP).

Information processing apparatuses that perform CEP may receive a large number of event records. If the number of event records received per unit time increases, a backlog develops, which results in a delay in processing the events. In view of this, there has been proposed a technique for accelerating processing of event streams by using a coprocessor. According to this proposal, for example, filtering of the received event stream and matching with a rule condition are performed in parallel on a coprocessor, thereby accelerating the processing.

There has also been proposed a processing description language that allows the use of a clause represented by a character string "RETAIN" in the description of rules and enables execution of processing of multiple event records that are arrived before reaching the number of events or the time specified in the "RETAIN" clause. Further, there has also been proposed a technique that extends an event processing language so as to enable event processing based on the detection result of a pattern from filtered streaming events and the detection result of a historical pattern from past events.

International Publication Pamphlet No. WO2009/140363
International Publication Pamphlet No. WO2008/150675
Japanese Laid-open Patent Publication No. 2011-86288

When an information processing apparatus processes received event records according to the procedure described in a rule, the information processing apparatus might execute a useless operation.

For example, the result of a first operation based on a certain event record is often used in a second operation. Further, for example, a determination of whether to execute the second operation is often made in accordance with the result of a condition determination which is not dependent on the result of the first operation. In this case, there may be a rule describing that the first operation is executed before the condition determination is made. Then, however, if a determination not to execute the second operation is made by the condition determination after execution of the first operation, it indicates that the result of the first operation was obtained although not needed. That is, the first operation was executed uselessly, resulting in inefficiency. As long as processing is performed according to the procedure described in the rule, it is difficult to prevent execution of such a useless operation.

SUMMARY

According to an aspect, there is provided a non-transitory computer-readable recording medium storing therein an event processing program that causes a computer to perform a process including: searching rule information that includes information indicating a plurality of operations that is started according to types of events indicated in event data, to find information indicating a first operation that is started for event data of a first type, information indicating an operation of a condition determination that is executable using the event data regardless of a result of the first operation and that is started after the first operation is executed, and information indicating a second operation whose execution is determined depending on a result of the condition determination and which uses the result of the first operation; generating, for the first type, control information for controlling an execution order of the operations such that execution of the first operation is determined depending on a result of the condition determination and such that the second operation is started after the first operation is executed; and executing, when the event data of the first type is input, the operations corresponding to the input event data, based on the control information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of output event data according to the second embodiment;

FIG. 8 illustrates an example of a home table according to the second embodiment;

FIG. 10 illustrates an example of a definition rule according to the second embodiment;

FIG. 11 illustrates an example of a processing rule according to the second embodiment;

FIG. 12 illustrates an example of a definition rule management table according to the second embodiment;

FIG. 13 illustrates an example of a control table according to the second embodiment;

FIG. 14 illustrates an example of an optimized control table according to the second embodiment;

FIG. 17 depicts an example of modifying a rule according to the second embodiment;

FIG. 21 illustrates a comparative example (No. 1) of a rule set;

FIG. 22 illustrates a comparative example (No. 2) of a rule set;

FIG. 23 illustrates an example of an event count table according to the second embodiment;

FIG. 24 illustrates an example of a rule structure according to a third embodiment;

FIG. 25 illustrates an example of a value structure according to the third embodiment;

DESCRIPTION OF EMBODIMENTS

Hereinafter, embodiments will be described with reference to the accompanying drawings.

(First Embodiment)

Figure 1:
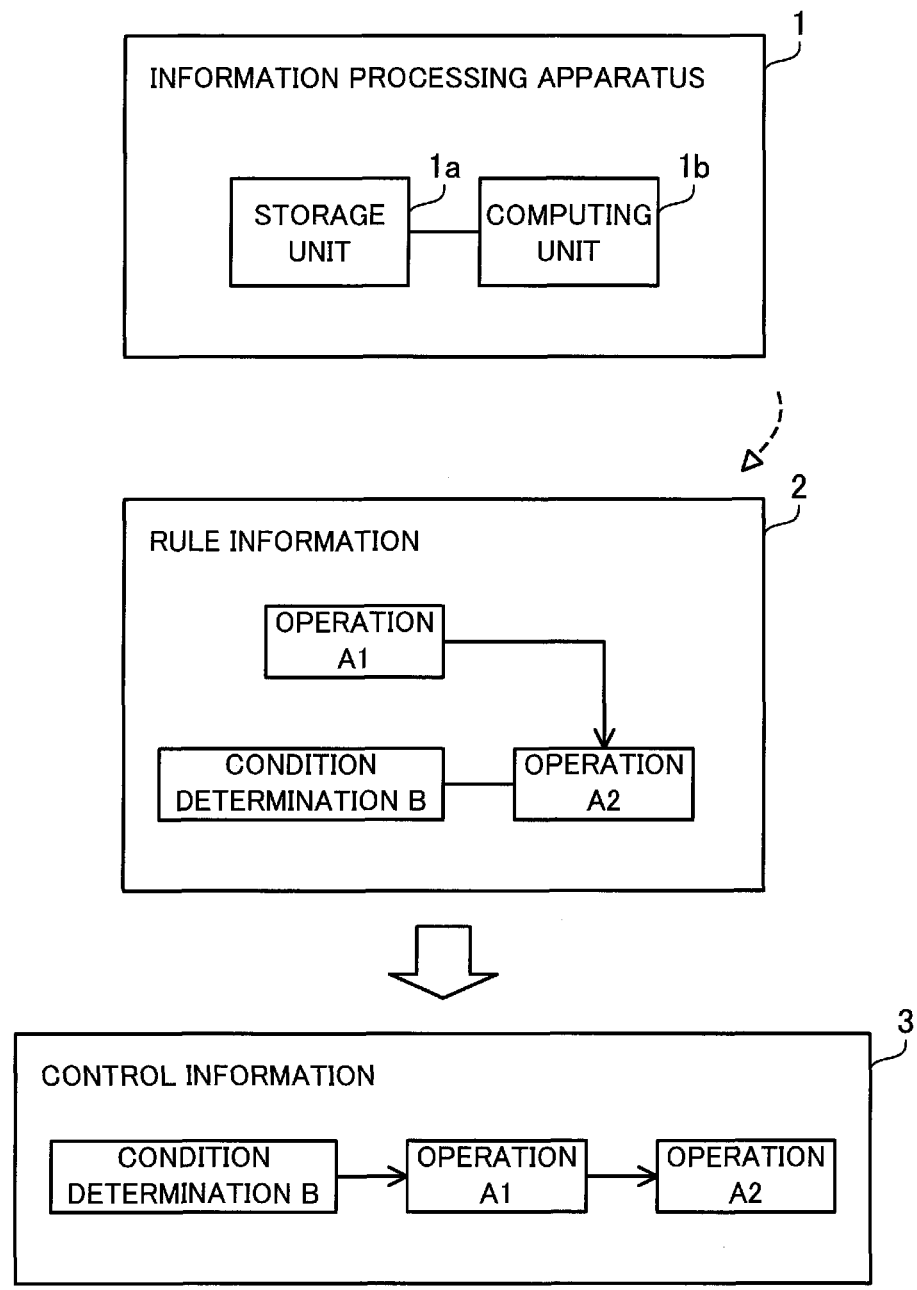
FIG. 1 illustrates an information processing apparatus according to a first embodiment.

FIG. 1 illustrates an information processing apparatus according to a first embodiment. An information processing apparatus 1 may include a processor such as a CPU (Central Processing Unit) or the like and a memory such as a RAM (Random Access Memory) or the like. The information processing apparatus 1 may be a computer in which the processor executes a program stored in the memory. Further, the information processing apparatus 1 may include an electronic circuit such as an FPGA (Field Programmable Gate Array), an ASIC (Application Specific Integrated Circuit), or the like, and the functions of the information processing apparatus 1 may be realized by the electronic circuit.

The information processing apparatus 1 includes a storage unit 1a and a computing unit 1b.

The storage unit 1a stores rule information 2 that includes information indicating a plurality of operations based on event data. The event data is input to the information processing apparatus 1 from an event source apparatus (not illustrated) that is connected to the information processing apparatus 1 via a network. The rule information 2 is created in advance by the user. The rule information 2 is information describing a rule indicating which operation is executed for the input event data by the information processing apparatus 1.

The information indicating a plurality of operations may include, for example, information indicating an operation that uses the input event data directly or indirectly. The operation that uses the input event data directly includes, for example, an operation of a condition determination for the input event data. Further, the operation that uses the input event data directly may include an operation (JOIN) for joining the event data and an external table that is stored in the storage unit 1a or a storage device (not illustrated). The operation that uses the input event data directly may also include an operation of performing a predetermined calculation for the event data, an operation of controlling other apparatuses, and the like. The operation that uses the input event data indirectly includes, for example, an operation of controlling other apparatuses based on the result of the join operation or the like, and an operation of updating control information held in the information processing apparatus 1. The operation that uses the input event data indirectly may include an operation of a condition determination using the result of the join operation, and the like.

The computing unit 1b searches the rule information 2 to find information indicating a first operation A1, information indicating an operation of a condition determination B that is executable regardless of the result of the first operation A1, and information indicating a second operation A2 that is associated with the condition determination B and uses the result of the first operation A1. The first operation A1 includes, for example, an operation of joining event data and an external table. The first operation A1 may include an operation of performing a predetermined calculation using the event data, and the like. The second operation A2 includes, for example, an operation of controlling an event source apparatus or other apparatuses based on the result of the join operation. The second operation A2 may include an operation of a condition determination using the result of the join operation, and the like.

The condition determination B that is executable regardless of the result of the first operation A1 is a condition determination whose result is not affected by the result of the first operation A1. In other words, the condition determination B is a condition determination that does not use the result of the first operation A1. The condition determination B includes, for example, a condition determination whose result is obtained by directly determining the input event data.

Further, the case where the condition determination B and the second operation A2 are associated with each other includes the case where the rule describes that a determination of whether to execute the second operation A2 is made in accordance with the result of the condition determination B. This also includes the case where the rule describes that the result of the second operation A2 is obtained in parallel with the condition determination B. The latter case is, more specifically, the case where the second operation A2 is an operation of another condition determination using the result of the first operation A1 and the rule describes that another operation that follows is executed based on the result of the condition determination B and the result of the other condition determination.

The computing unit 1b generates control information 3 for controlling the execution order of the operations such that the first operation A1 is executed in accordance with the result of the condition determination B and such that the second operation A2 is executed after the first operation A1. The computing unit 1b stores the generated control information 3 in the storage unit 1a. When event data is input, the computing unit 1b executes an operation corresponding to the input event data, based on the control information 3 stored in the storage unit 1a.

According to the information processing apparatus 1, the computing unit 1b searches the rule information 2 to find information indicating the first operation A1, information indicating the operation of the condition determination B that is executable regardless of the result of the first operation A1, and information indicating the second operation A2 that is associated with the condition determination B and uses the result of the first operation A1. The computing unit 1b generates the control information 3 for controlling the execution order of the operations such that the first operation A1 is executed in accordance with the result of the condition determination B and such that the second operation A2 is executed after the first operation A1. When the event data is input, the computing unit 1b executes an operation corresponding to the input event data, based on the control information 3.

This makes it possible to process events efficiently. The following is a specific example. For instance, the second operation A2 included in the rule information 2 is executed on the premise that the result of the first operation A1 has been obtained. Meanwhile, the second operation A2 is associated with the condition determination B. Thus, depending on how the rule is described, the first operation A1 might be executed before the condition determination B.

Further, some rule description languages clearly separate operations of condition determinations from other operations, and determine the processing order such that the other operations are executed after the condition determinations, thereby increasing the processing speed. This is because if operations include only condition determinations, it is possible to process the condition determinations at high speed using a register or the like. Therefore, these languages do not often allow a join operation to be included in an operation of a condition determination, for example. In the case of using these languages, if the second operation A2 is an operation that uses the result of the first operation A1, the first operation A1 is executed before the condition determination B.

However, in the case where the rule defines that the first operation A1 is executed before the condition determination B, the first operation A1 might be executed uselessly, resulting in inefficiency. This is because, depending on the result of the condition determination B, the second operation A2 does not need to be executed. However, depending on the way of describing rules, even if it is possible to define the processing order, it is difficult to force the user to create rules while always taking into consideration the order of operations. Further, as mentioned above, in some languages, the rule is executable only in such processing order that the first operation A1 is executed before the condition determination B.

In view of this, the information processing apparatus 1 generates control information 3 based on the rule information 2. The information processing apparatus 1 executes an operation corresponding to the input event data, based on the control information 3. For example, it is assumed that the condition determination B is a condition determination whose result is obtained using the input event data (condition determination that does not use the result of the first operation A1). It is also assumed that the rule information 2 describes that the second operation A2 is executed if the result of the condition determination B is true, and the second operation A2 is not executed if the result of the condition determination B is false.

In this case, the control information 3 for controlling such that the first operation A1 is executed if the result of the condition determination B is true, and the first operation A1 is not executed if the result of the condition determination B is false is generated. Accordingly, when certain event data is input, if the result of the condition determination B is true, the first operation A1 and the second operation A2 are executed in this order. When another event record is input, if the result of the condition determination B is false, neither the first operation A1 nor the second operation A2 is executed. This is because when there is no need to execute the second operation A2, there is no need to execute the first operation A1 on which the second operation A2 is based.

In this way, by controlling whether to execute the first operation A1 in accordance with the result of the condition determination B, it is possible to prevent the first operation A1 from being executed uselessly. As a result, the number of operations to be executed for each event is reduced, so that the number of events processable per unit time is increased. Further, since the backlog of other events due to generation of a useless operation is reduced, it is possible to reduce the delay in executing an operation in response to generation of an event. Further, by extracting the condition determination B as a filter condition, it is possible to implement a condition determination function as a module so as to process the condition determination B at high speed using a register, for example.

Further, the control information 3 is generated based on the rule information 2, and event processing is performed based on the control information 3. Therefore, even in the case where the rule is described by the user such that the first operation A1 is executed before the condition determination B, it is possible to control the processing order so as to prevent the first operation A1 from being executed uselessly. Further, it is possible to reduce the burden on the user to describe rules taking the processing order into consideration, and it is therefore possible to reduce the effort that the user has to make to describe rules.

(Second Embodiment)

Figure 2:
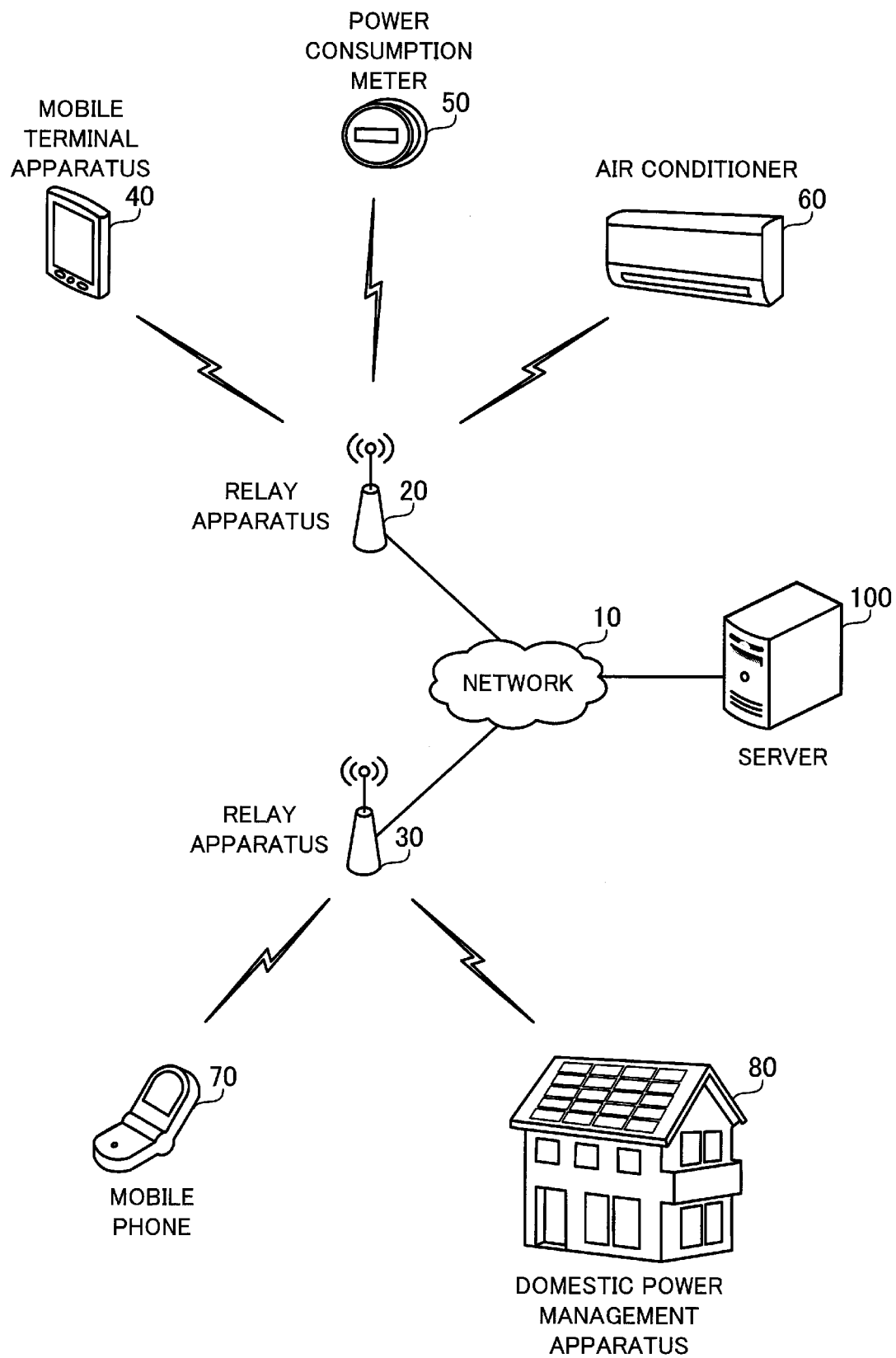
FIG. 2 illustrates an information processing system according to a second embodiment.

FIG. 2 illustrates an information processing system according to a second embodiment. The information processing system according to the second embodiment is a system in which various apparatuses are connected via a network 10 and relay apparatuses 20 and 30, and which controls event source apparatuses and other apparatuses according to events generated in these apparatuses. The second information processing system includes a mobile terminal apparatus 40, a power consumption meter 50, an air conditioner 60, a mobile phone 70, a domestic power management apparatus 80, and a server 100.

The mobile terminal apparatus 40, the power consumption meter 50, and the air conditioner 60 are connected to the server 100 via the relay apparatus 20 and the network 10. The mobile phone 70 and the domestic power management apparatus 80 are connected to the server 100 via the relay apparatus 30 and the network 10. The network 10 may be a LAN (Local Area Network), or a WAN (Wide Area Network) such as the Internet, and the like. The relay apparatuses 20 and 30 may be router apparatuses, switching apparatuses, or the like that relay radio or wired communication. The relay apparatuses 20 and 30 may be radio base stations.

The mobile terminal apparatus 40 is an electronic apparatus that receives an input from the user, and transmits an event record corresponding to the input to the server 100. The mobile terminal apparatus 40 is also able to receive from the server 100 a message or the like corresponding to an event generated in the information processing system, and to provide the message or the like to the user.

The power consumption meter 50 is a meter that measures the amount of power consumed at home. The power consumption meter 50 is often called a smart meter. The power consumption meter 50 transmits an event record including the measured power consumption to the server 100.

The air conditioner 60 is an electric appliance installed in the same house as the power consumption meter 50. The air conditioner 60 transmits an event record including the current temperature setting (the target indoor temperature) to the server 100. Upon receiving an instruction for temperature adjustment from the server 100 in response to an event generated in the information processing system, the air conditioner 60 changes the temperature setting in accordance with the instruction. This is performed for the purpose of power saving, for example. The air conditioner 60 is also able to receive from the server 100 a message or the like corresponding to an event generated in the information processing system, and provides the message or the like to the user. In the following description, it is assumed that a heating function is used in the air conditioner 60.

The mobile phone 70 is an electronic apparatus that receives an input from the user, and transmits an event record corresponding to the input to the server 100. The mobile phone 70 is also able to receive from the server 100 a message or the like corresponding to an event generated in the information processing system, and to provide the message or the like to the user.

The domestic power management apparatus 80 is an apparatus that manages the amount of power generated by solar power generation or the like. Upon receiving an instruction for switching between the power selling state and the power purchasing state or the like from the server 100, the domestic power management apparatus 80 switches between the power selling state and the power purchasing state or the like in accordance with the instruction.

The server 100 is a server computer that performs operations for controlling the respective apparatuses in response to event records that are continually received from the respective apparatuses. A plurality of event records received from the apparatuses are often called an event stream. The server 100 executes operations corresponding to the event stream, using the CEP technology.

Figure 3:
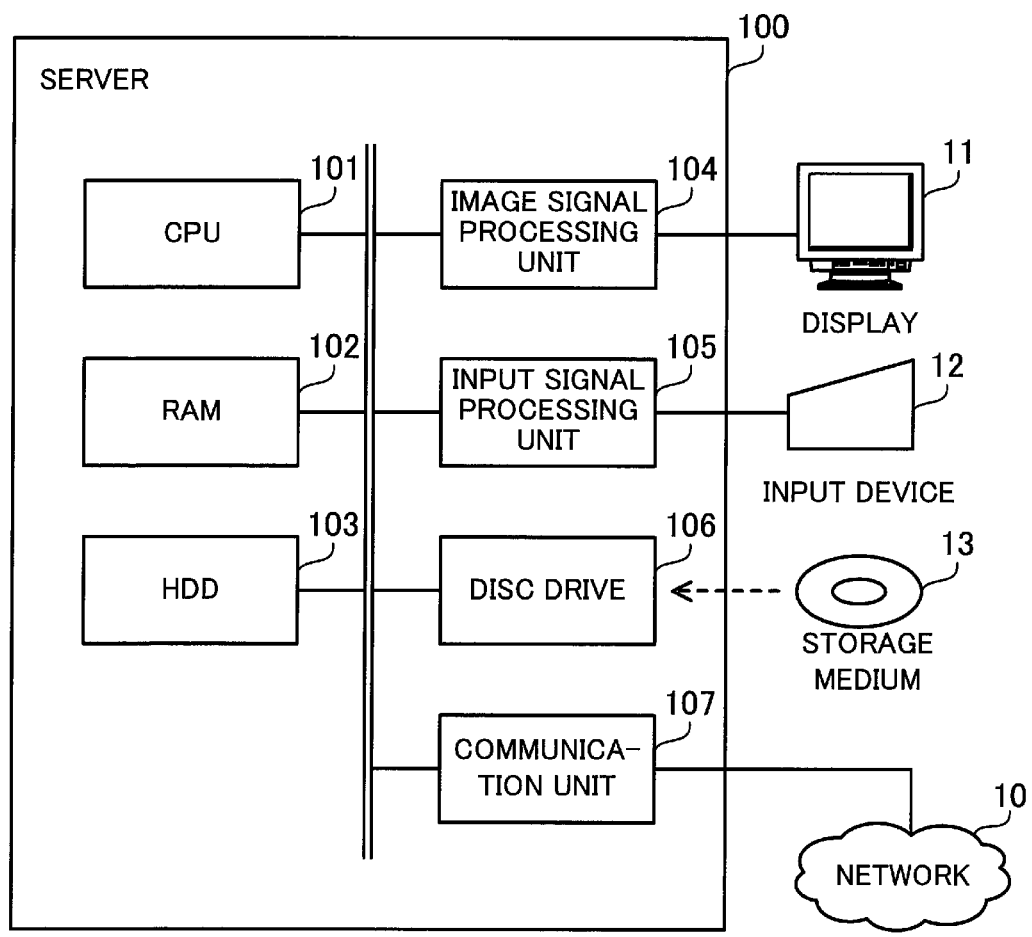
FIG. 3 illustrates an example of the hardware of a server according to the second embodiment.

FIG. 3 illustrates an example of the hardware of the server according to the second embodiment. The server 100 includes a CPU 101, a RAM 102, an HDD (Hard Disk Drive) 103, an image signal processing unit 104, an input signal processing unit 105, a disc drive 106, and a communication unit 107. Each unit is connected to a bus of the server 100.

The CPU 101 is a processor that controls information processing performed by the server 100. The CPU 101 reads at least part of a program and data stored in the HDD 103, and expands the program and data in the RAM 102 so as to execute the program. The server 100 may include multiple processors, and may perform processing in a distributed manner using the multiple processors.

The RAM 102 is a volatile memory that temporarily stores a program executed by the CPU 101 and data used for processing. The server 100 may include multiple memories.

The HDD 103 is a non-volatile storage device that stores software programs, such as an OS (Operating System) program, application programs, and so on, and data. The HDD 103 reads data from and writes data to an internal magnetic disk in accordance with a command from the CPU 101. The server 100 may include, in place of or in addition to the HDD 103, other storage devices such as an SSD (Solid State Drive) and the like.

The image signal processing unit 104 outputs an image to a display 11 connected to the server 100, in accordance with a command from the CPU 101. Examples of the display 11 include CRT (Cathode Ray Tube) displays, liquid crystal displays, and the like.

The input signal processing unit 105 obtains an input signal from an input device 12 connected to the server 100, and outputs the input signal to the CPU 101. Examples of the input device 12 include pointing devices, such as mice, touch panels, and the like; keyboards; and so on.

The disc drive 106 is a drive that reads a program and data stored in a storage medium 13. Examples of the storage medium 13 include magnetic storage devices, optical discs, magneto-optical storage media, and semiconductor memories. Examples of magnetic storage devices include HDDs, flexible disks (FDs), magnetic tapes, and the like. Examples of optical discs include CD (Compact Disc), CD-R (CD-Recordable), CD-RW (CD-Rewritable), DVD (Digital Versatile Disc), DVD-R, DVD-RW, DVD-RAM, and the like. Examples of magneto-optical storage media include MO (Magneto-Optical disk) and the like. Examples of semiconductor memories include flash memories such as USB (Universal Serial Bus) memories and the like. The disc drive 106 reads the program and data from the storage medium 13, and stores the read program and data in the RAM 102 or the HDD 103, in accordance with a command from the CPU 101, for example.

The communication unit 107 is a wired or radio communication interface that communicates with other apparatuses via the network 10 and the relay apparatuses 20 and 30.

Figure 4:
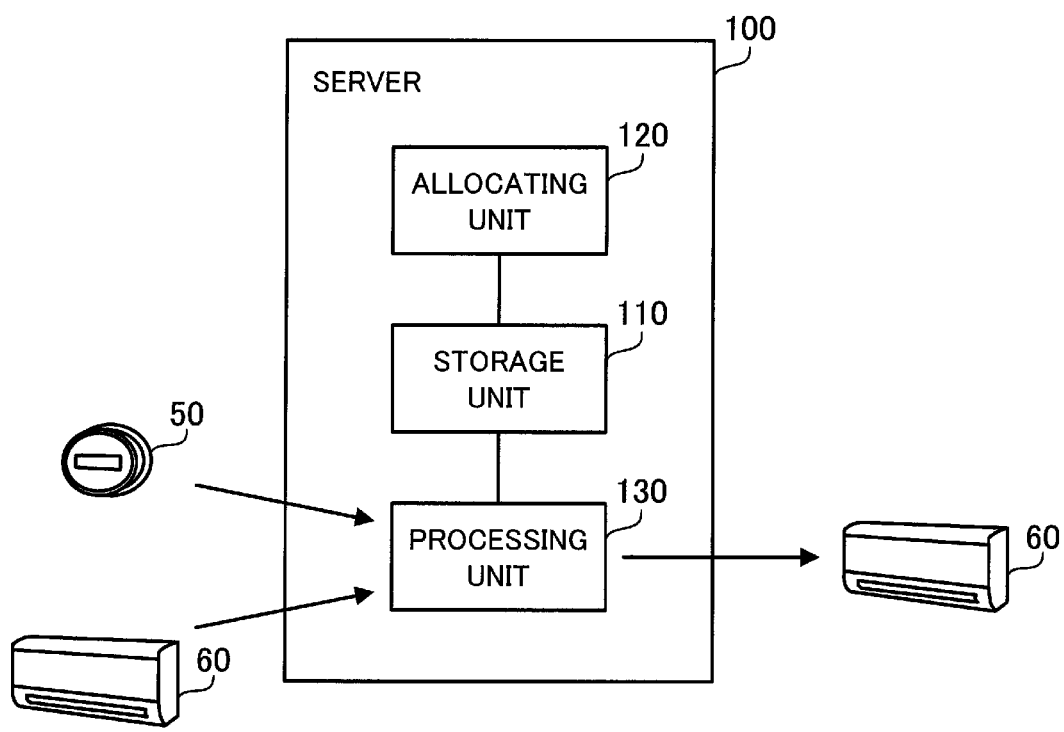
FIG. 4 illustrates an example of the software of the server according to the second embodiment.

FIG. 4 illustrates an example of the software of the server according to the second embodiment. Part or all of the units illustrated in FIG. 4 may be modules of the program executed by the server 100. Further, part or all of the units illustrated in FIG. 4 may be electronic circuits such as FPGA, ASIC, and the like.

The server 100 includes a storage unit 110, an allocating unit 120, and a processing unit 130.

The storage unit 110 stores data used for processing by the allocating unit 120 and the processing unit 130. More specifically, the storage unit 110 stores rule information created by the creator. The rule information includes information indicating a plurality of operations to be executed in response to an event. The rule information is input in advance in the server 100. Further, the storage unit 110 stores control information used by the processing unit 130 for controlling the execution order of the operations indicated by the rule information. This control information is generated by the allocating unit 120, and is stored in the storage unit 110. The storage unit 110 may be implemented as the RAM 102 and the HDD 103.

The allocating unit 120 generates control information based on the rule information stored in the storage unit 110, and stores the control information in the storage unit 110. The allocating unit 120 searches for operations having a predetermined relationship based on information indicating each operation, which is included in the rule information, and generates control information by rearranging the execution order of the found operations.

Upon receiving an event record from another apparatus, the processing unit 130 executes an operation corresponding to the event record, based on the control information stored in the storage unit 110. In the following, an example will be described in which the server 100 controls the air conditioner 60 based on event records received from the power consumption meter 50 and the air conditioner 60.

Figure 5:
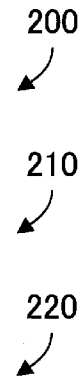
FIG. 5 illustrates an example of input event data according to the second embodiment.

FIG. 5 illustrates an example of input event data according to the second embodiment. Event data 200 is data transmitted from each apparatus to the server 100. The event data 200 includes the following fields: Event Type, id (identifier), and Data.

In the "Event Type" field, information indicating the type of a generated event is set. In the "id" field, identification information for identifying the event source apparatus is set. In the item "Data", information indicating the content of an event is stored. In the item "Data", different types of information may be set by different types of event source apparatuses. For example, the information set in the item "Data" by the power consumption meter 50 is information indicating the measured power consumption. For example, the information set in the item "Data" by the air conditioner 60 is information indicating the current temperature setting. FIG. 5 also illustrates event records 210 and 220.

The event record 210 is an event record generated by the power consumption meter 50 and transmitted to the server 100. The setting content in each field of the event record 210 is as follows. In the "Event Type", "P" indicating that the event is related to a power consumption meter is set. In the "id", "0011" is set as the identification information of the power consumption meter 50. In the "Data", "1510 (Wh)" is set as the measured power consumption. The event record 210 is transmitted from the power consumption meter 50 to the server 100 at a predetermined timing, for example. The event record 210 may be transmitted periodically, or may be transmitted when the measured power consumption exceeds the threshold.

The event record 220 is an event record generated by the air conditioner 60 and transmitted to the server 100. The setting content in each field of the event record 220 is as follows. In the "Event Type", indicating that the event is related to an air conditioner is set. In the "id", "0021" is set as the identification information of the air conditioner 60. In the "Data", "22 (° C.)" is set as the current temperature setting of the air conditioner 60. The event record 220 is transmitted from the air conditioner 60 to the server 100 at a predetermined timing, for example. The event record 220 may be transmitted periodically, or may be transmitted when the temperature setting is changed.

FIG. 6 illustrates an example of output event data according to the second embodiment. Event data 300 is event data generated by the processing unit 130 and transmitted to each apparatus. For example, the event data 300 is data for controlling each apparatus. The event data 300 includes the following fields: Event Type, id (identifier), and Data. The setting content of each field is the same as that of the field having the same name in the event data 200. FIG. 6 also illustrates an event record 310.

The event record 310 is an event record generated by the processing unit 130 in accordance with the event records 210 and 220 and transmitted to the air conditioner 60. The setting content in each field of the event record 310 is as follows. In the "Event Type", "A" indicating that the event is related to an air conditioner is set. In the "id", "0021" is set as the identification information of the air conditioner 60. In the "Data", "20 (° C.)" is set as the temperature setting for the air conditioner 60.

The following describes an example of modules of the processing unit 130 that processes the event data 200.

Figure 7:
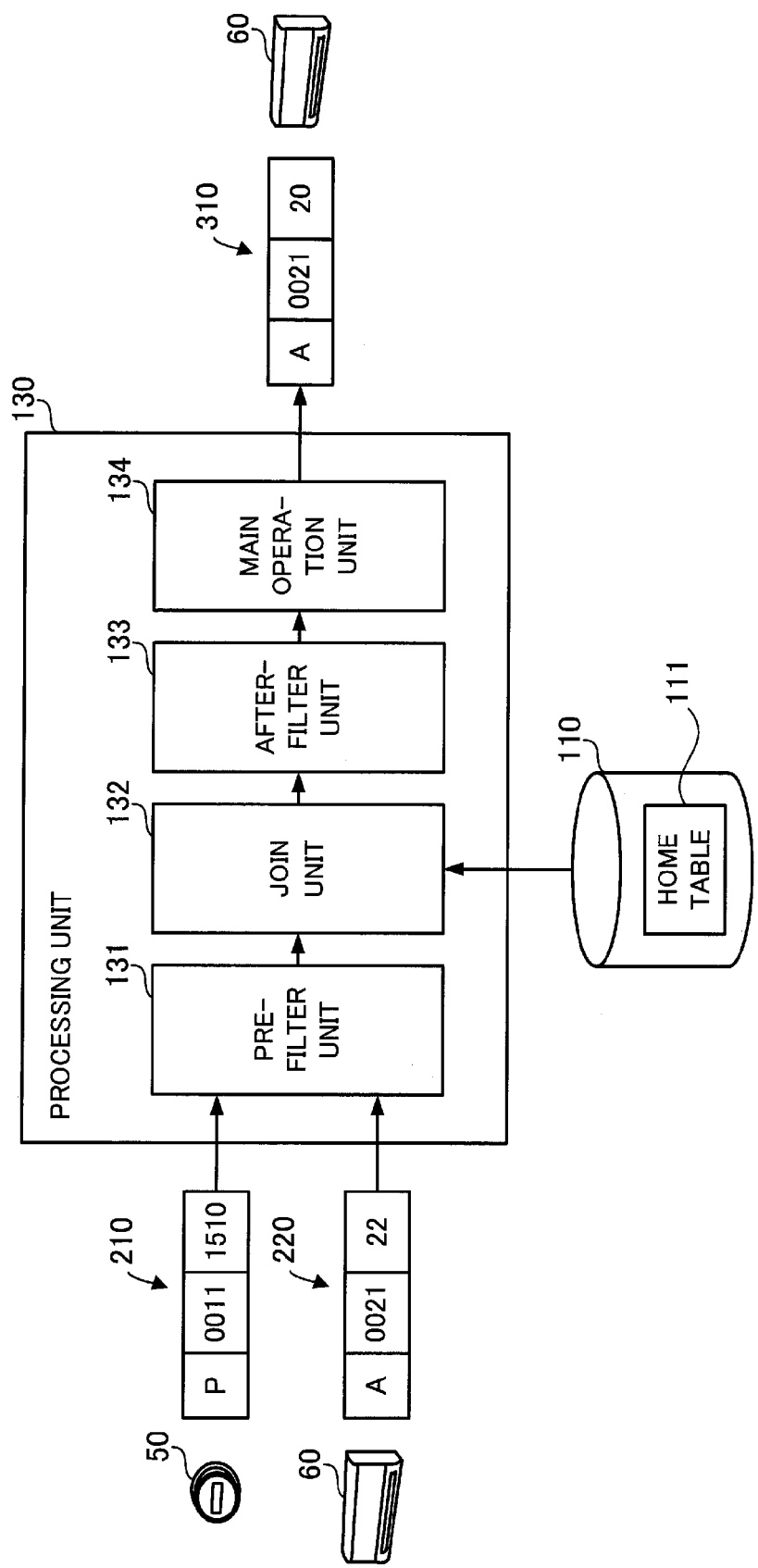
FIG. 7 illustrates an example of a processing unit according to the second embodiment.

FIG. 7 illustrates an example of a processing unit according to the second embodiment. Part or all of the units illustrated in FIG. 7 may be modules of the program executed by the server 100. Further, part or all of the units illustrated in FIG. 7 may be electronic circuits such as FPGA, ASIC, and the like.

The processing unit 130 includes a pre-filter unit 131, a JOIN unit 132, an after-filter unit 133, and a main operation unit 134.

The pre-filter unit 131 determines whether to execute a subsequent operation using the event record 210 or the event record 220. A subsequent operation is performed in the JOIN unit 132 or the main operation unit 134. The subsequent operation is determined by the rule described in the rule information.

The JOIN unit 132 joins the event records 210 and 220 to external data. The external data is stored, for example, in the storage unit 110. The external data may be stored in an external storage device that is accessible from the server 100. In this example, a home table 111 is stored in the storage unit 110 as the external data. The home table 111 includes information on a house (building) in which the power consumption meter 50 and the air conditioner 60 are installed. Depending on the content of the rules described in the rule information, processing by the JOIN unit 132 may be skipped.

The after-filter unit 133 determines whether to execute a subsequent operation in the main operation unit 134 using the JOIN result obtained by the JOIN unit 132. Depending on the content of the rules described in the rule information, processing by the after-filter unit 133 may be skipped.

The main operation unit 134 performs a main operation such as updating information that is managed by the main operation unit 134 or the like, in accordance with the event records 210 and 220, or calls an exit operation when needed, so as to generate the event record 310. Depending on the content of the rules described in the rule information, the main operation unit 134 may use the JOIN result obtained by the JOIN unit 132.

In this way, the processing unit 130 is able to cause the pre-filter unit 131, the JOIN unit 132, the after-filter unit 133, and the main operation unit 134 to execute a condition determination, a JOIN operation, and a main operation by assigning these operations thereto. The pre-filter unit 131 and the after-filter unit 133 for performing a filtering operation, the JOIN unit 132 for performing a JOIN operation, and the main operation unit 134 for performing a main operation are clearly separated modules, and therefore may be easily implemented so as to suit the respective operations. For example, the pre-filter unit 131 and the after-filter unit 133 are dedicated to performing a filtering operation, and therefore may be implemented so as to perform high-speed processing using a register.

FIG. 8 illustrates an example of the home table according to the second embodiment. The home table 111 is stored in the storage unit 110. The home table 111 includes the following items: id, power, aircon, maxpow, name, and area.

In the item "id", identification information for identifying a house (building) is registered. In the item "power", identification information of a power consumption meter installed in the house is registered. In the item "aircon", identification information of an air conditioner installed in the house is registered. In the item "maxpow", a threshold of power consumption (Wh) in the house is registered. This threshold is used for determining an event. In the item "name", the name of the user is registered. In the item "area", information indicating the area where the house is located is registered.

For example, the following information is registered in the home table 111: "0001" in the "id"; "0011" in the "power"; "0021" in the "aircon"; "1500" in the "maxpow"; "user1" in the "name"; and "Tokyo" in the "area". This information indicates that a power consumption meter 50 with the id information "0011" and an air conditioner 60 with the id information "0021" are installed in a house with the identification information "0001". Further, this information indicates that the power consumption threshold used for determining an event is "1500" (Wh); the name of the user is "user1"; and the house is located in the area classified as Tokyo.

In the home table 111, a record with an id "0002" is also registered. This record is information on a house of another user. In this record, for example, a power consumption meter with the power "0012" and an air conditioner with the aircon "0022" are registered. That is, the home table 111 is relationship data including a plurality of records in which a plurality of items are defined.

Figure 9:
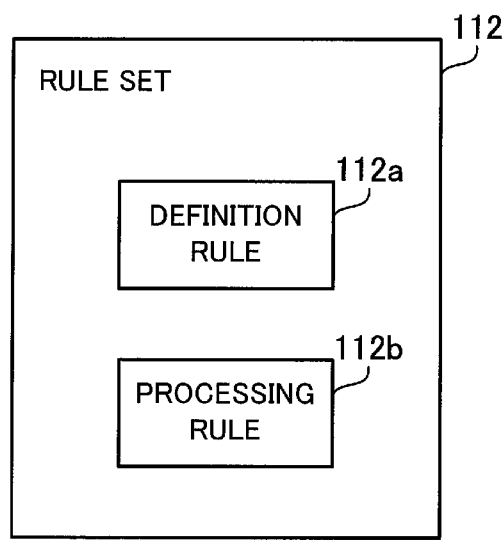
FIG. 9 illustrates an example of a rule set according to the second embodiment.

FIG. 9 illustrates an example of a rule set according to the second embodiment. A rule set 112 is stored in the storage unit 110. The rule set 112 is rule information that is created in advance by a manager of the information processing system or the like. The rule set 112 includes a definition rule 112a and a processing rule 112b.

The definition rule 112a is data describing general rules related to events.

The processing rule 112b is data describing the concrete processing content for the events defined by the definition rule 112a.

The server 100 allows the definition rule 112a and the processing rule 112b to be input individually. The allocating unit 120 or the processing unit 130 may receive individual inputs of the definition rule 112a and the processing rule 112b, and store the inputs in the storage unit 110. A plurality of definition rules 112a and a plurality of processing rules 112b may be created so as to describe definitions related to different events, and be stored in the storage unit 110.

Further, a plurality of rule sets may be created in accordance with different combinations of events. For example, definition rules and processing rules related to a first set of events may be registered in a first rule set, and definition rules and processing rules related to a second set of events not overlapping the first set of events may be registered in a second rule set.

FIG. 10 illustrates an example of the definition rule according to the second embodiment. The definition rule 112a is data describing general rules for events (event type "P") related to a power consumption meter and events (event type "A") related to an air conditioner. The following describes each of rules using line numbers that are assigned to the definition rule 112a for descriptive purposes. Note that the line numbers correspond to the reference signs of rules. For example, a rule of the line number d1 is represented as a rule d1. A description corresponding to the rule d1 is "P(id, pow);", for example. A description corresponding to one line number is one rule.

Rules d1 and d2 are event definitions. The rule d1 defines, for an event of the event type "P", a variable "id" indicating identification information of a power consumption meter and a variable "pow" indicating the power consumption. Taking the event record 210 as an example, id="0011", and pow="1510". The rule d2 defines, for an event of the event type "A", a variable "id" indicating identification information of an air condition and a variable "temp" indicating the temperature. Taking the event record 220 as an example, id="0021", and temp="22".

A rule d3 includes definitions of external data and items included therein. The rule d3 defines items "id", "power", "aircon", "maxpow", "name", and "area" for the home table 111 (table name "Home").

A rule d4 includes a definition of a window for managing the status corresponding to an event. By using a window, it is possible to hold data indicating the status in the RAM 102. The rule d4 defines that the power consumption (pow) of each house indicated by the item "id" of the home table 111 is held by using a window named "Home.pow". For example, in the case of holding pow="1510" as information on the house of id="0001", the identification information of the house and the power consumption are stored in association with each other as "Home(0001).pow=1510" in the RAM 102. Note that, in the following description, "Home(id).pow" may be expressed as "Home.pow" without a portion specifying the "id".

Rules d5l and d6 are definitions of a JOIN operation for joining event data and an external table. The rule d5 defines that a record of the home table 111 having the "power" value that matches the "id" value of an event record of the event type "P" is extracted, and that a record in which all the items of the both records are combined is obtained. The rule d6 defines that a record of the home table 111 having the "aircon" value that matches the "id" value of an event record of the event type "A" is extracted, and that a record in which all the items of the both records are combined is obtained.

The rule d5 does not include information indicating an operation of a condition determination. Accordingly, the rule d5 may be regarded as information indicating a single operation. The same applies to the rule d6. Further, the rules d5 and d6 begin with a fixed phrase "Select" for performing a JOIN, and contain "where" indicating a JOIN condition. Thus, the rules d5 and d6 may be identified as rules for performing a JOIN operation.

FIG. 11 illustrates an example of the processing rule according to the second embodiment. The processing rule 112b is data describing the concrete processing content for events related to a power consumption meter and events related to an air conditioner. The following describes each of rules using line numbers that are assigned to the processing rule 112b for descriptive purposes. As in the case of FIG. 10, the line numbers correspond to the reference signs of rules. For example, a rule of the line number r1 is represented as a rule r1. A description corresponding to the rule r1 is "IF P.pow >500 THEN Set P.Home.pow=P.pow;", for example. A description corresponding to one line number is one rule.

Rules r1, r2, and r3 are rules each defining the processing content for an event.

The rule r1 defines that if the power consumption (pow) that is included in an event record (event type "P") transmitted from a power consumption meter is greater than 500 (Wh), the power consumption is set in the "Home.pow" as the power consumption of the house. When setting the power consumption in the "Home.pow" in accordance with the rule r1, the power consumption is held in the Home.pow window in association with the "id" in the home table 111. Therefore, the rule r1 uses the result of the JOIN operation represented by the rule d5. That is, the rule r1 is executed based on the premise that the identification information of a house ("id" in the home table 111) corresponding to the identification information of a power consumption meter in an event record is obtained.

In the rule r1, "P.pow>500" is information indicating a condition determination. It is possible to identify the information indicating the condition determination from a string of a fixed phrase "IF". Further, "Set P.Home.pow=P.pow" is information indicating an operation associated with "P.pow>500". A fixed phrase "THEN" indicates that information in the "IF" indicating a condition determination and information following "THEN" and indicating an operation are associated with each other. Further, as mentioned above, "Set P.Home.pow=P.pow" is an operation that uses the result of the JOIN operation represented by the rule d5.

The rule r2 defines that if the temperature (temp) that is included in an event record (event type "A") transmitted from an air conditioner is higher than 25 (° C.), a recommendation message "Lowering the temperature setting will reduce power consumption" is transmitted.

In the rule r2, "A.temp>25" is information indicating a condition determination. Further, "Send A.msg="Lowering the temperature setting will reduce power consumption"" is information indicating an operation associated with information indicating the condition determination. As in the case of the rule r1, it is possible to identify these pieces of information from strings "IF" and "THEN".

The rule r3 defines that if the temperature (A.temp) that is included in an event record (event type "A") transmitted from an air conditioner is higher than 20 (° C.) and equal to or lower than 25 (° C.) and if the power consumption of the house (Home.pow) is greater than the power consumption threshold for the house (Home.maxpow), the temperature setting of the air conditioner is controlled to be lowered by 2° C. Here, the rule r3 obtains the power consumption from the "Home.pow" and compares the power consumption with the "Home.maxpow". In this case, as in the case of the rule r1, the rule r3 uses the ID of the house. That is, the rule r3 is executed based on the premise that the identification information of a house ("id" in the home table 111) corresponding to the identification information of an air conditioner in an event record and the power consumption threshold for the house ("maxpow" in the home table 111) are obtained.

In the rule r3, "A.temp>20", "A.temp<=25", and "A.Home.pow>A.Home.maxpow" are pieces of information indicating condition determinations. It is possible to identify the pieces of information indicating the respective condition determinations from a string of a fixed phrase "IF". The condition determinations are associated with each other by a string of a fixed phrase "AND". Further, as mentioned above, "A.Home.pow>A.Home.maxpow" is an operation that uses the result of the JOIN operation represented by the rule d6. Further, "Cont A.temp-=2" is information indicating an operation associated with operations of the above condition determinations. A fixed phrase "THEN" indicates that pieces of information (connected with "AND") in the "IF" each indicating a condition determination and information following "THEN" and indicating an operation are associated with each other.

FIG. 12 illustrates an example of a definition rule management table according to the second embodiment. A definition rule management table 113 is generated by the allocating unit 120, and is stored in the storage unit 110. The definition rule management table 113 includes the following items: No., Type, Name, and Included Items.

In the item "No.", information for identifying each rule in the definition rule 112a is registered. Here, each line of the definition rule 112a is managed as one rule. Accordingly, the line number of the definition rule 112a corresponds to a setting value of the item "No.". In the item "Type", information indicating the type of the rule is registered. In the item "Name", information indicating the name of the type of the rule is registered. In the item "Included Items", information indicating items included in the rule is registered. However, in the case where the type is "JOIN Result", the names of items obtained as the result of a JOIN operation are registered in the item "Included Items".

For example, the following information is registered in the definition rule management table 113: "d1 " in the "No."; "Event" in the "Type"; "P" in the "Name"; and "P.id, P.pow" in the "Included Items". This corresponds to the definition "P(id, pow)" of the rule d1. Similarly, the record of No. "d2 " corresponds to the definition of the rule d2.

Further, for example, the following information is registered in the definition rule management table 113: "d3 " in the "No."; "External Table" in the "Type"; "Home" in the "Name"; and "Home.id, Home.power, Home.aircon, Home.maxpow, Home.name, Home.area" in the "Included Items". This corresponds to the rule d3.

Further, for example, the following information is registered in the definition rule management table 113: "d4 " in the "No."; "Window" in the "Type"; "Home.pow" in the "Name"; and "Home.pow" in the "Included Items". This corresponds to the definition of the window "Home.pow" of the rule d4.

Further, for example, the following information is registered in the definition rule management table 113: "d5 " in the "No."; "JOIN Result" in the "Type"; "P.Home" in the "Name"; and "P.id, P.pow, P.Home.id, P.Home.aircon, P.Home.maxpow, P.Home.name, P.Home.area" in the "Included Items". These items correspond to all the items obtained as the result of the JOIN operation of the rule d5. This is because the rule d5 defines "Select * . . . ". Here, each of the items contained in the home table 111 is represented with a string "P.Home" at the beginning of the name of the item. This is to provide consistency with the expressions in the processing rule 112b, and to indicate that the items are those of the "Home" related to the event "P".

Further, for example, the following information is registered in the definition rule management table 113: "d6 " in the "No."; "JOIN Result" in the "Type"; "A.Home" in the "Name"; and "A.id, A.temp, A.Home.id, A.Home.power, A.Home.maxpow, A.Home.name, A.Home.area" in the "Included Items". These items correspond to all the items obtained as the result of the JOIN operation of the rule d6. This is because the rule d6 defines "Select * . . . ". Here, each of the items contained in the home table 111 is represented with a string "A.Home" at the beginning of the name of the item. This is to provide consistency with the expressions in the processing rule 112b, and to indicate that the items are those of the "Home" related to the event "A".

FIG. 13 illustrates an example of a control table according to the second embodiment. A control table 114 is generated by the allocating unit 120, and is stored in the storage unit 110. The control table 114 includes the following items: No., Pre-Filter, JOIN, After-Filter, Status (Window), and Main Operation.

In the item "No.", information for identifying each rule in the processing rule 112b is registered. Here, each line of the processing rule 112b is managed as one rule. Accordingly, the line number of the processing rule 112b corresponds to a setting value of the item "No.". In the item "Pre-Filter", information in the rule indicating an operation of a condition determination executed by the pre-filter unit 131 is registered. In the item "JOIN", information in the rule indicating a JOIN operation executed by the JOIN unit 132 is registered. In the item "After-Filter", information in the rule indicating an operation of a condition determination executed by the after-filter unit 133 is registered. In the item "Status (Window)", information indicating the window used by the rule is registered. In the item "Main Operation", information in the rule indicating a main operation executed by the main operation unit 134 is registered.

For example, the following information is registered in the control table 114 with respect to the record of No. "r1".
(1) Pre-Filter: "P.pow>500"
(2) JOIN: "Select*From P, Home Where P.id=Home.power;"
(3) After-Filter: none (indicated by a hyphen "-"; the same applies hereinafter)
(4) Status (Window): "Home.pow"
(5) Main Operation: "Set P.Home.pow=P.pow"

This is the result that the rule r1 of the processing rule 112b is divided and allocated to the pre-filter unit 131, the JOIN unit 132, the after-filter unit 133, and the main operation unit 134 by the allocating unit 120. However, there is no operation corresponding to the after-filter unit 133. Therefore, in the rule r1, processing by the after-filter unit 133 is skipped.

Further, for example, the following information is registered in the control table 114 with respect to the record of No. "r2".
(1) Pre-Filter: "A.temp>25"
(2) JOIN: none
(3) After-Filter: none
(4) Status (Window): none
(5) Main Operation: "Send A.msg="..."""

Note that the content of the recommendation message in the main operation may be omitted and indicated by " . . . " (the same applies hereinafter).

This is the result that the rule r2 of the processing rule 112b is divided and allocated to the pre-filter unit 131, the JOIN unit 132, the after-filter unit 133, and the main operation unit 134 by the allocating unit 120. However, there is no operation corresponding to either the JOIN unit 132 or the after-filter unit 133. Therefore, in the rule r2, processing by the JOIN unit 132 and the after-filter unit 133 is skipped.

Further, for example, the following information is registered in the control table 114 with respect to the record of No. "r3".
(1) Pre-Filter: "A.temp>20 A.temp<=25"
(2) JOIN: "Select * From A, Home Where A.id=Home.aircon;"
(3) After-Filter: "A.Home.pow>A.Home.maxpow"
(4) Status (Window): "Home.pow"
(5) Main Operation: "Cont A.temp -=2"

Note that the two conditions with respect to A.temp in the pre-filter is an AND condition.

This is the result that the rule r3 of the processing rule 112b is divided and allocated to the pre-filter unit 131, the JOIN unit 132, the after-filter unit 133, and the main operation unit 134 by the allocating unit 120.

FIG. 14 illustrates an example of an optimized control table according to the second embodiment. A control table 114a is generated by the allocating unit 120, and is stored in the storage unit 110. The control table 114a is information obtained through a predetermined optimization process that is applied to the control table 114 by the allocating unit 120. The control table 114a includes the following items: No., Pre-Filter, JOIN, After-Filter, Status (Window), and Main Operation. The setting content in each item is the same as the setting content in the item with the same name in the control table 114. However, the control tables 114 and 114a differ from each other partly in the setting content in the item "JOIN" and the items that follow.

More specifically, the differences in the "JOIN" item of the record of No. "r1" are as follows.
(1) JOIN in the control table 114: "Select * . . . "
(2) JOIN in the control table 114a: "Select Home.id . . . "

This is because the subsequent main operation "Set P.Home.pow=P.pow" uses only the item "P.Home.id" among the items obtained as the JOIN result of the rule d5. More specifically, the main operation specifies a window related to the house among Home.pow windows, based on "P.Home.id".

Further, the differences in the "JOIN" item of the record of No. "r3" are as follows.
(1) JOIN in the control table 114: "Select * . . . "
(2) JOIN in the control table 114a: "Select Home.id Home.maxpow . . . "

This is because the after-filter in the subsequent stage uses only the items "A.Home.id" and "A.Home.maxpow" among the items obtained as the JOIN result of the rule d6, and the main operation does not use the JOIN result. That is, for the subsequent operations, only the "A.Home.id" and "A.Home.maxpow" need to be obtained as the JOIN result. More specifically, the after-filter specifies a window related to the house from Home.pow windows, based on the "A.Home.id". Further, the after-filter uses the "A.Home.maxpow" as a comparison value for the "A.Home.pow".

Further, the differences in the "Main Operation" item of the record of No. "r1" are as follows.
(1) Main Operation in the control table 114: "Set P.Home.pow=P.pow"
(2) Main Operation in the control table 114a: "Set Home.pow=P.pow"

This is because the "Home.id" has been obtained by the JOIN unit in the preceding stage, and therefore the main operation unit is able to directly process the "Home.pow" using the obtained "Home.id".

Further, the differences in the "After-Filter" item of the record of No. "r3" are as follows.
(1) After-Filter in the control table 114: "A.Home.pow>A.Home.maxpow"
(2) After-Filter in the control table 114a: "Home.pow>Home.maxpow"

This is because the "Home.id" has been obtained by the JOIN unit in the preceding stage, and therefore the after-filter unit is able to directly process the "Home.pow" and "Home.maxpow" using the obtained "Home.id".

Figure 15:
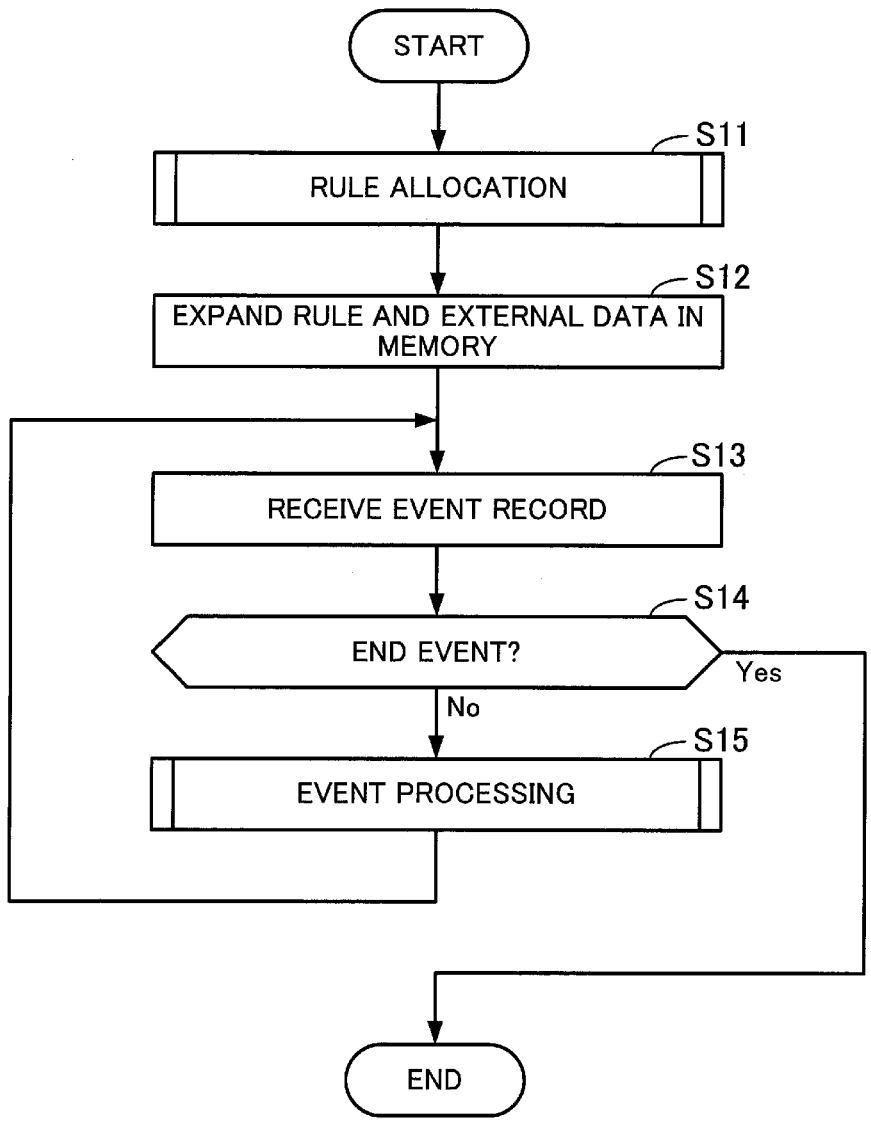
FIG. 15 is a flowchart illustrating a processing example according to the second embodiment.

FIG. 15 is a flowchart illustrating an example of a process according to the second embodiment. In the following, the process illustrated in FIG. 15 will be described in order of step number.

(Step S11) The allocating unit 120 performs allocation of rules. More specifically, the allocating unit 120 generates the control tables 114 and 114a based on each of rules included in the definition rule 112a and the processing rule 112b of the rule set 112 stored in the storage unit 110. More specifically, the allocating unit 120 searches for pieces of information each indicating an operation, which is included in each rule, and allocates the pieces of information each indicating an operation to the pre-filter, the JOIN, the after-filter, and the main operation.

(Step S12) The processing unit 130 expands the rule and external data in the memory. More specifically, the processing unit 130 reads the control table 114a and the home table 111 into the RAM 102. Thus, the processing unit 130 becomes ready to receive an event.

(Step S13) The processing unit 130 receives an event record.

(Step S14) The processing unit 130 determines whether the received event record indicates an end event. If the received event record is an end event, the processing unit 130 releases the area in the RAM 102 where the control table 114a and the home table 111 are located. If the received event record is not an end event, the process proceeds to step S15. Note that an end event is an event for causing the processing unit 130 to end the event processing. When the event record is an end event, it indicates that the event type contained in the event record includes information indicating an end event.

(Step S15) The processing unit 130 performs an operation corresponding to the event record, based on the control table 114a. Then, the process returns to step S13.

In this way, the processing unit 130 performs event processing, based on the control table 114a generated by the allocating unit 120. The following describes the operation of step S11 in detail.

Figure 16:
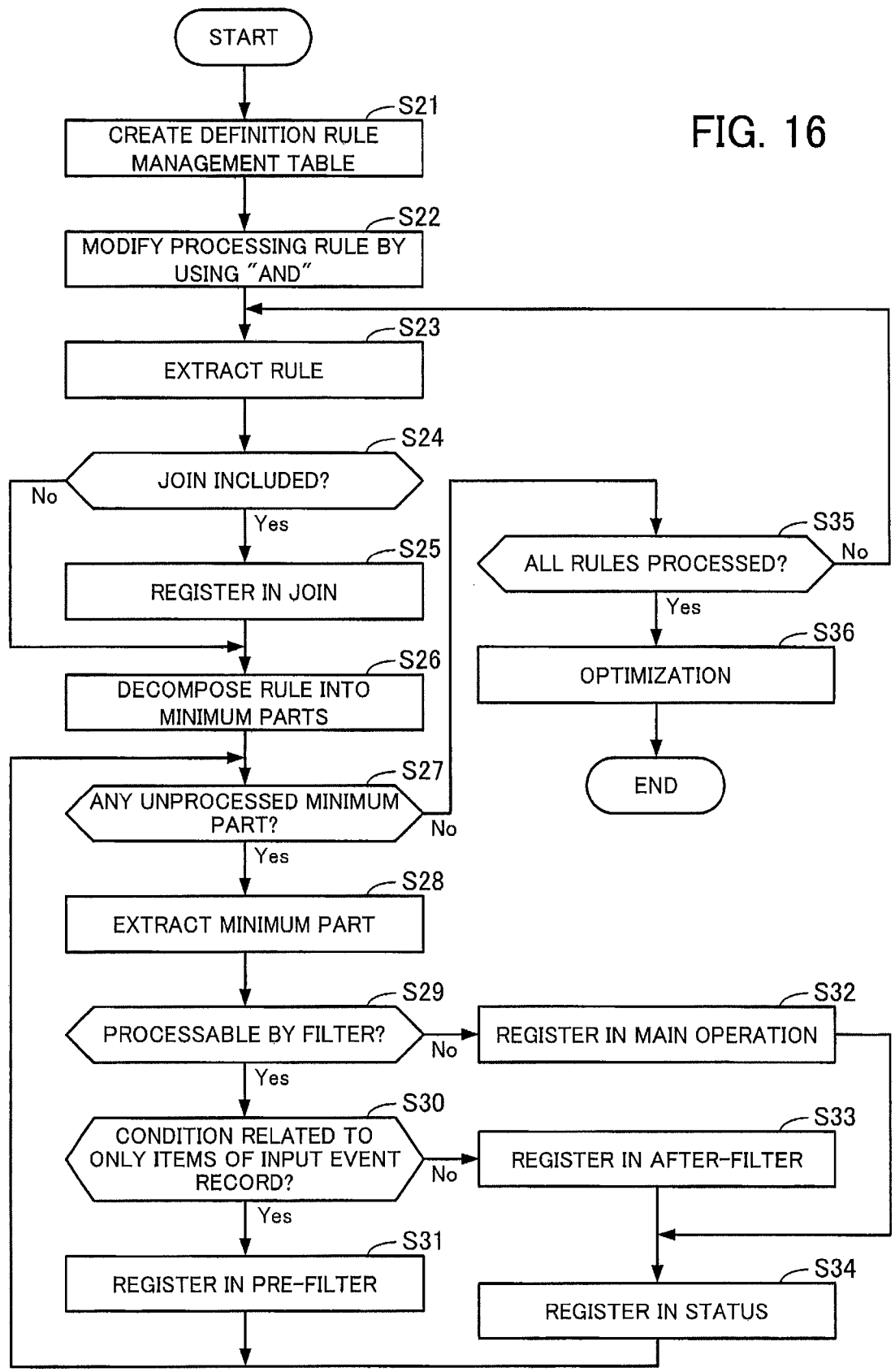
FIG. 16 is a flowchart illustrating an example of rule allocation according to the second embodiment.

FIG. 16 is a flowchart illustrating an example of rule allocation according to the second embodiment. In the following, the process illustrated in FIG. 16 will be described in order of step number.

(Step S21) The allocating unit 120 creates a definition rule management table 113 based on the definition rule 112a stored in the storage unit 110, and stores the definition rule management table 113 in the storage unit 110. As mentioned above, the definition rule management table 113 may be created by dividing items contained in each rule of the definition rule 112a. For example, as for the rule d1, "P(id, pow);" is divided by a comma "," so as to obtain "P.id" and "P.pow" in the "Included Items". The same applies to the rules d2 and d3. Further, as for the rule d4, the name of the window "Home.pow" is obtained from the "Window Home.pow;". Further, as for the rule d5, the "Select" phrase and "Where P.id=Home.power" indicate obtaining the result of joining the event record of the event type "P" and the home table 111. Further, "Select *" indicates obtaining all the items of the joined result. Accordingly, all the items of the result of joining the event record of the event type "P" and the home table 111, namely, "P.id, P.pow, P.Home.id, P.Home.aircon, P.Home. maxpow, P.Home.name, and P.Home.area", are obtained. The same applies to the rule d6. However, at this stage, a JOIN operation is not actually performed. The items of the joined result are merely extracted. The allocating unit 120 stores each of the items obtained from the definition rule 112a in the definition rule management table 113, in association with the rule number ("d1" and so on), the type, and the name.

(Step S22) The allocating unit 120 modifies each of the rules included in the processing rule 112b using an "AND" condition. Note that modifying a rule by using an "AND" condition means rewriting a rule including conditions connected with "OR" into a plurality of rules including only "AND". Thus, it is possible to perform the subsequent steps for even the rules including "OR", using the modified rules. The details of the operation of step S22 will be described below.

(Step S23) The allocating unit 120 extracts a rule (corresponding to one line of the processing rule 112b) from the processing rules that are modified in step S22. In the subsequent steps, the rule extracted in step S23 is referred to simply as an "extracted rule".

(Step S24) The allocating unit 120 determines whether the extracted rule includes a JOIN operation, based on the definition rule management table 113. If a JOIN operation is included, the process proceeds to step S25. If a JOIN operation is not included, the process proceeds to step S26. The allocating unit 120 is able to determine whether a JOIN operation is included, based on whether an operation using any of the items in the "Included Items" corresponding to the type "JOIN Result" of the definition rule management table 113 is present in the extracted rule. For example, as for the rule r1, in the operation of "Set P.Home.pow=P.pow", "P.Home.id" included in the result of the JOIN operation of the rule d5 is used in order to specify a window "Home" of the house where the power consumption meter is installed. Accordingly, the allocating unit 120 determines that the rule r1 includes a JOIN operation. In the manner described above, the rule r2 is determined not to include a JOIN operation. The rule r3 is determined to include a JOIN operation.

(Step S25) The allocating unit 120 registers, for the extracted rule, a JOIN operation in the item "JOIN" of the control table 114. More specifically, as for the rule r1, the JOIN operation represented by the rule d5 is included as described in step S24. Accordingly, the allocating unit 120 registers information indicating the JOIN of the rule d5 in the item "JOIN" of the rule r1 (the record of No. "r1") in the control table 114.

(Step S26) The allocating unit 120 decomposes the extracted rule into minimum parts. The term "minimum part" refers to a minimum unit of a condition in a condition determination portion (information indicating an operation of a condition determination), or a main operation portion (information indicating an operation that is executed in accordance with the result of a condition determination), each of which is obtained by dividing information included in a rule. The details of the operation will be described below. Each rule includes one or more minimum parts.

(Step S27) The allocating unit 120 determines whether there is any unprocessed minimum part that has not undergone the operations in the subsequent steps S28 through S34 among the minimum parts obtained by the decomposition in step S26. If there is any unprocessed minimum part, the process proceeds to step S28. If there is no unprocessed minimum part, in other words, if all the minimum parts have been processed, the process proceeds to step S35.

(Step S28) The allocating unit 120 extracts one of the unprocessed minimum parts. In the subsequent steps, the minimum part extracted in step S28 is referred to simply as an "extracted minimum part".

(Step S29) The allocating unit 120 determines whether the extracted minimum part is processable by a filter. If the extracted minimum part is processable by a filter, the process proceeds to step S30. If the extracted minimum part is not processable by a filter, the process proceeds to step S32. Here, the extracted minimum part is processable by a filter if the extracted minimum part is information indicating an operation of a condition determination and if the item included in the minimum part is processable using only the items present in the "Included Items" of the definition rule management table 113 corresponding to the event. For example, as will be described below, information indicating an operation of a condition determination "P.pow>500" may be extracted as a minimum part from the rule r1. This minimum part is related to the event type "P". According to the definition rule management table 113, this minimum part is processable by obtaining only the "P.pow" registered in the rule d1. Accordingly, the allocating unit 120 determines that "P.pow>500" is a minimum part processable by a filter. Further, for example, as will be described below, information indicating an operation "Set P.Home.pow=P.pow" may be extracted as a minimum part from the rule r1. In this case, the allocating unit 120 determines that the minimum part is not processable by a filter because the minimum part is not an operation of a condition determination.

(Step S30) The allocating unit 120 determines whether the extracted minimum part is a condition related to only the items of the input event record. If the extracted minimum part is a condition related to only the items of the input event record, the process proceeds to step S31. If the extracted minimum part is not a condition related to only the items of the input event record, the process proceeds to step S33. For example, the above-described minimum part "P.pow>500"

that may be extracted from the above-described rule r1 is processable using only "P.pow" included in the input event record. Accordingly, the allocating unit 120 determines that the minimum part is a condition related to only the items of the input event record. On the other hand, a minimum part "A.Home.pow>A.Home.maxpow" that may be extracted from the rule r3 includes items that are obtained as the result of the JOIN operation represented by the rule d6. Accordingly, the allocating unit 120 determines that the minimum part is not a condition related to only the items of the input event record.

(Step S31) The allocating unit 120 registers, for the extracted rule, the extracted minimum part in the item "Pre-Filter" of the control table 114. For example, the allocating unit 120 registers the minimum part "P.pow>500" extracted from the rule r1 in the item "Pre-Filter" of No. "r1" in the control table 114. Then, the process returns to step S27.

(Step S32) The allocating unit 120 registers, for the extracted rule, the extracted minimum part in the item "Main Operation" of the control table 114. For example, the allocating unit 120 registers the minimum part "Set P.Home.pow=P.pow" extracted from the rule r1 in the item "Main Operation" of No. "r1" in the control table 114. Then, the process proceeds to step S34.

(Step S33) The allocating unit 120 registers, for the extracted rule, the extracted minimum part in the item "After-Filter" of the control table 114. For example, the allocating unit 120 registers the minimum part "A.Home.pow> A.Home.maxpow" extracted from the rule r3 in the item "After-Filter" of No. "r3" in the control table 114. Then, the process proceeds to step S34.

(Step S34) If there is a window that is used in the after-filter or the main operation for the extracted rule, the allocating unit 120 registers information indicating the window in the item "Status (Window)" of the control table 114. Then, the process proceeds to step S27. For example, the minimum part "Set P.Home.pow=P.pow" illustrated in step S32 uses the window "Home.pow" defined by the rule d4. Accordingly, the allocating unit 120 registers, for the rule r1, the "Home.pow" in the item "Status (Window)" of No. "r1" in the control table 114. If no window is used in either the after-filter or the main operation for the extracted rule, the allocating unit 120 does not register any information in the "Status (Window)".

(Step S35) The allocating unit 120 determines whether step S23 and the subsequent steps are executed for all the rules of the processing rule modified in step S22. If all the rules have been processed, the process proceeds to step S36. If there is any unprocessed rule, the process returns to step S23.

(Step S36) The allocating unit 120 creates a control table 114a by optimizing the control table 114. The control table 114a is created in the manner illustrated in FIG. 14. By performing optimization, the number of items to be obtained as the JOIN result is minimized. Thus, the operations following the JOIN are simplified.

In this way, the allocating unit 120 creates the control table 114 based on the rule set 112. Further, the allocating unit 120 creates the control table 114a based on the control table 114.

Note that in step S29, the extracted minimum part is not processable by a filter in the case where, for example, the extracted minimum part is information indicating a condition determination using a special function in the main operation. This is because, in this case, it may be difficult to know in advance the items that are obtained as the result of the function, and it is difficult to manage the items obtained by the function in the definition rule management table 113. However, if the result obtained by the function is known in advance, the items may be managed in the definition rule management table 113.

The following describes an example of modifying a rule using "AND" in step S22.

FIG. 17 depicts an example of modifying a rule according to the second embodiment. Since a rule including "OR" is not present in the processing rule 112b, a new rule r4 is illustrated in FIG. 17. The new rule r4 is illustrated in order to explain this example, and has no connection to the rule set 112. Here, the rule r4 is "IF X=A AND (Y=B OR Z=C) THEN SET W=A;".

First, the allocating unit 120 rewrites the rule r4 to obtain an equivalent single rule r5 using a logical formula in which the conditions combined with an "AND" condition are combined with OR. The rule r5 is "IF (X=A AND Y=B) OR (X=A AND Z=C) THEN SET W=A;".

Further, since the rule r5 includes an "OR" condition, the allocating unit 120 rewrites the rule r5 into a plurality of rules r6 and r7 equivalent to the rule r5 (that is, equivalent to the rule r4) and each including only an "AND" condition. The rule r6 is "IF X=A AND Y=B THEN SET W=A;". The rule r7 is "IF X=A AND Z=C THEN SET W=A;".

In this way, the allocating unit 120 modifies the rule r4 including "OR" into the rules r6 and r7 not including "OR". Thus, even if there is the rule r4 including "OR", it is possible to appropriately perform allocation to the pre-filter, the JOIN operation, the after-filter, and the main operation. If this modification is not performed, it is difficult to allocate the condition determination portions connected with "OR". This is because the result of the entire condition determination indicated by "IF" varies depending on the results of the two condition determinations connected with "OR", and thus the calculation of the result of the entire condition determination indicated by "IF" is complex.

The following describes examples of rule decomposition in step S26 of FIG. 16.

Figure 18A:
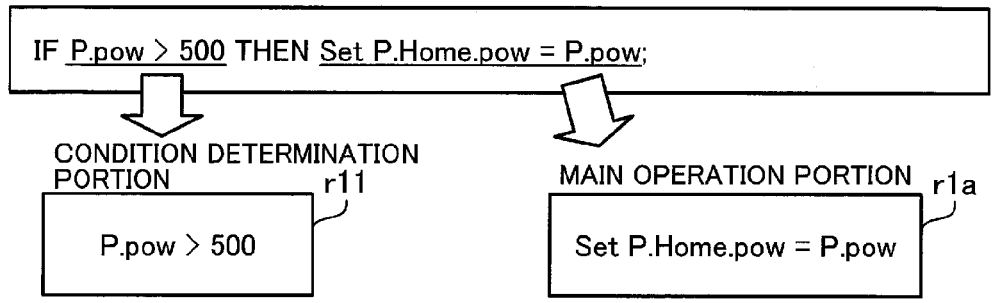
FIGS. 18A through 18C depict examples of rule decomposition according to the second embodiment.
Figure 18B:
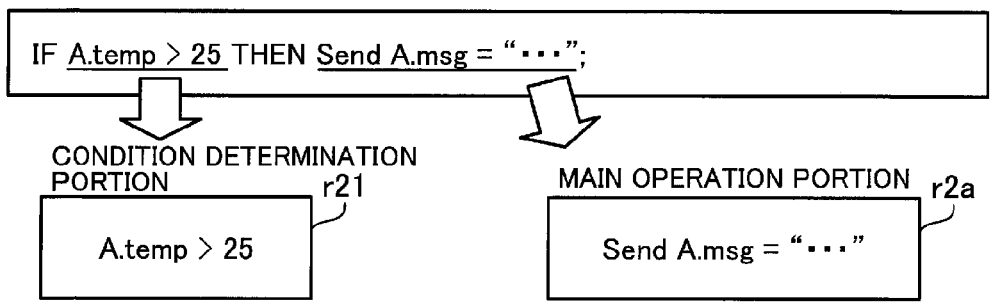
Figure 18C:
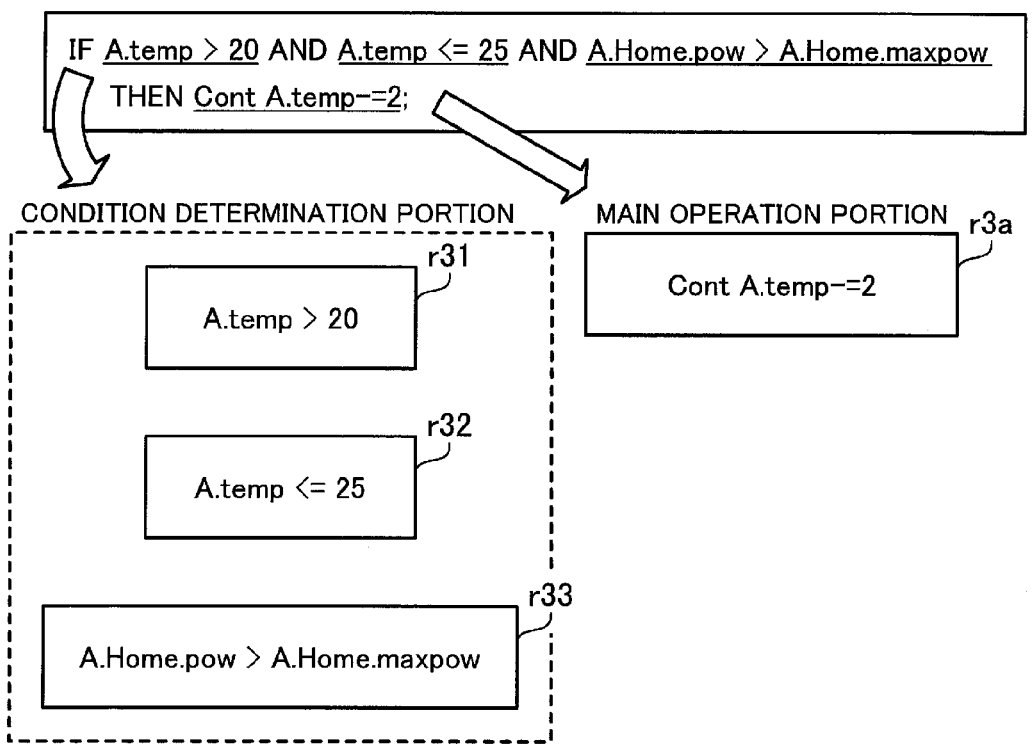

FIGS. 18A to 18C depict examples of rule decomposition according to the second embodiment. FIG. 18A illustrates rule decomposition of the rule r1. The rule r1 includes a condition determination portion r11 (information indicating an operation of a condition determination) and a main operation portion r1a (information indicating a main operation) using the fixed phrases "IF" and "THEN". Each of the condition determination portion r11 and the main operation portion r1a represents a single determination or a single operation, and is not decomposable any further. Therefore, the condition determination portion r11 and the main operation portion r1a are two minimum parts of the rule r1.

The allocating unit 120 determines "P.pow>500" immediately following "IF" as the condition determination portion r11. The allocating unit 120 determines "Set P.Home.pow=P.pow" immediately following "THEN" as the main operation portion r1a. In this way, the allocating unit 120 decomposes the rule r1 into two minimum parts, that is, the condition determination portion r11 and the main operation portion r1a.

According to the procedure illustrated in FIG. 16, the allocating unit 120 allocates the condition determination portion r11 to the pre-filter. This is because the condition determination portion r11 is processable using only the items included in the event data. The allocating unit 120 allocates the main operation portion r1a to the main operation. This is because the main operation portion r1a includes an operation other than a condition determination and is not processable by a filter.

FIG. 18B illustrates rule decomposition of the rule r2. The rule r2 includes a condition determination portion r21 and a main operation portion r2a using the fixed phrases "IF" and "THEN". Each of the condition determination portion r21 and the main operation portion r2a represents a single determination or a single operation, and is not decomposable any further. Therefore, the condition determination portion r21 and the main operation portion r2a are two minimum parts of the rule r2.

The allocating unit 120 determines "A.temp>25" immediately following "IF" as the condition determination portion r21. The allocating unit 120 determines "Send A.msg=" . . . ""' immediately following "THEN" as the main operation portion r2a. In this way, the allocating unit 120 decomposes the rule r2 into two minimum parts, that is, the condition determination portion r21 and the main operation portion r2a.

According to the procedure illustrated in FIG. 16, the allocating unit 120 allocates the condition determination portion r21 to the pre-filter. This is because the condition determination portion r21 is processable using only the items included in the event data. The allocating unit 120 allocates the main operation portion r2a to the main operation. This is because the main operation portion r2a includes an operation other than a condition determination and is not processable by a filter.

FIG. 18C illustrates rule decomposition of the rule r3. The rule r3 includes condition determination portions r31, r32, and r33 and a main operation portion r3a using the fixed phrases "IF", "AND", and "THEN". The condition determination portions r31, r32, and r33 and the main operation portion r3a are four minimum parts of the rule r3.

The allocating unit 120 determines "A.temp>20" immediately following "IF" as the condition determination portion r31. The allocating unit 120 determines "A.temp<=25" immediately following "AND" which comes after the condition determination portion r31 as the condition determination portion r32. The allocating unit 120 determines "A.Home.pow>A.Home.maxpow" immediately following "AND" which comes after the condition determination portion r32 as the condition determination portion r33. The allocating unit 120 determines "Cont A.temp -=2" immediately following "THEN" as the main operation portion r3a. In this way, the allocating unit 120 decomposes the rule r3 into four minimum parts, that is, the condition determination portions r31, r32, and r33, and the main operation portion r3a.

According to the procedure illustrated in FIG. 16, the allocating unit 120 allocates the condition determination portions r31 and r32 to the pre-filter. This is because the condition determination portions r31 and r32 are processable using only the items included in the event data. The allocating unit 120 allocates the condition determination portion r33 to the after-filter. This is because the condition determination portion r33 uses the JOIN result of the rule d5. The allocating unit 120 allocates the main operation portion r3a to the main operation. This is because the main operation portion r3a includes an operation other than a condition determination and is not processable by a filter.

Note that information for such determination of a fixed phrase and decomposition is provided in advance to the allocating unit 120.

The following describes the operation of step S15 of FIG. 15 in detail.

Figure 19:
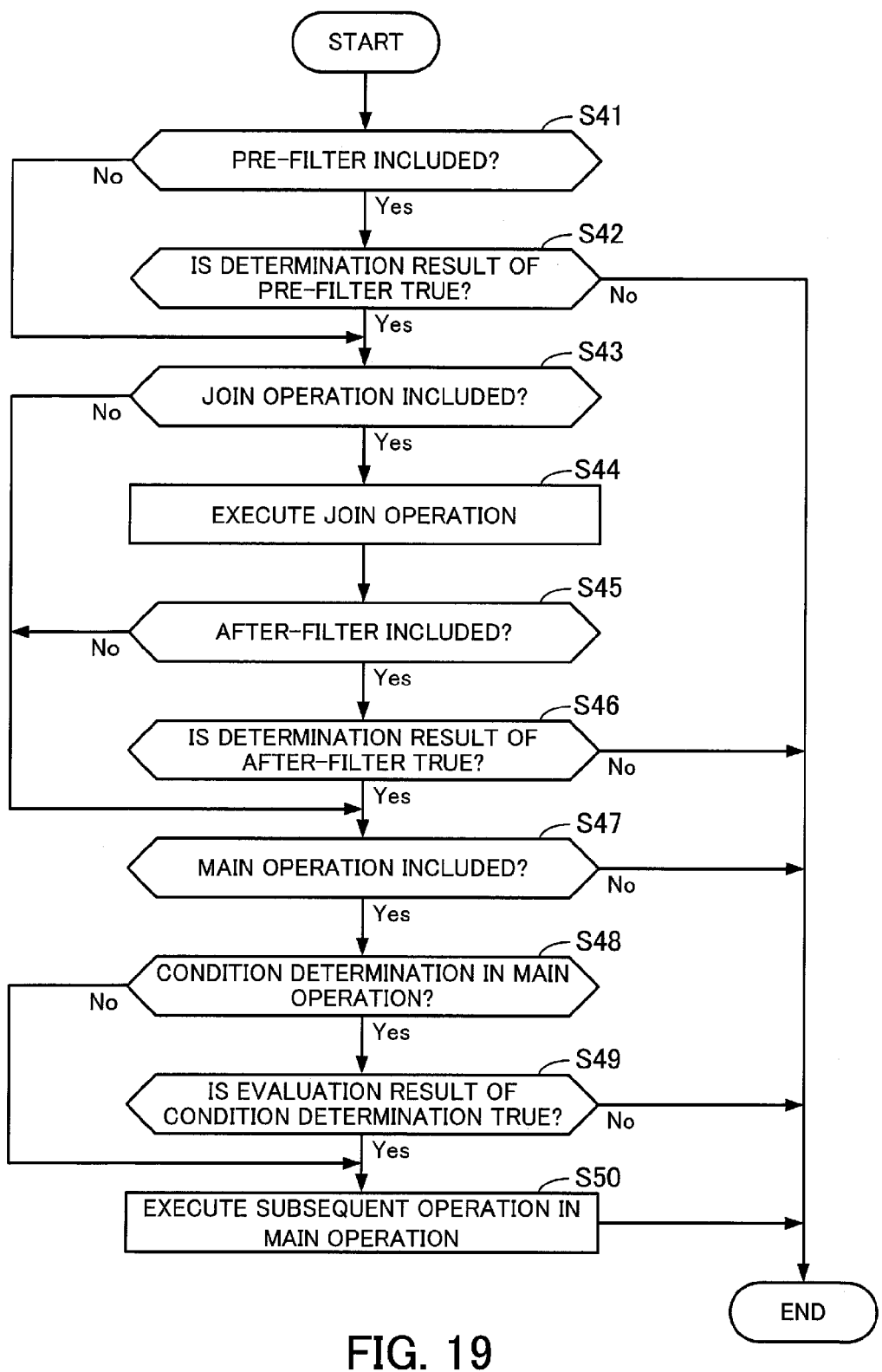
FIG. 19 is a flowchart illustrating an example of event processing according to the second embodiment.

FIG. 19 is a flowchart illustrating an example of event processing according to the second embodiment. In the following, the process illustrated in FIG. 19 will be described in order of step number.

(Step S41) The processing unit 130 determines whether a pre-filter is included in the rule corresponding to the event type of the received event record, based on the control table 114a. If a pre-filter is included, the process proceeds to step S42. If a pre-filter is not included, the process proceeds to step S43. For example, the event type of the event record 210 is "P". In the control table 114a, the rule corresponding to the event type "P" is the rule r1 (No. "r1"). For the rule r1, information indicating a condition determination is registered in the item "Pre-Filter" of the control table 114a. Accordingly, the processing unit 130 determines that there is a pre-filter for the event record 210. Further, for example, the event type of the event record 220 is "A". In the control table 114a, the rules corresponding to the event type "A" are the rules r2 and r3 (Nos. "r2" and "r3"). For at least one of the rules r2 and r3, information indicating a condition determination is registered in the item "Pre-Filter" of the control table 114a (in this example, such information is registered for the both). Accordingly, the processing unit 130 determines that there are pre-filters for the event record 220.

(Step S42) The pre-filter unit 131 executes the condition determination of the pre-filter in the control table 114a, for the rule that is determined to include a pre-filter in step S41. The pre-filter unit 131 determines whether the result of the condition determination is true. If the result of the condition determination is true, the process proceeds to step S43. If the result of the condition determination is false, the process ends. Note that the pre-filter unit 131 performs a determination of the pre-filter for each rule. For example, as for the event record 220, each of the rules r2 and r3 includes a pre-filter. The pre-filter unit 131 evaluates the pre-filter of each of the rules r2 and r3. In this case, if the results of the condition determinations of both the rules r2 and r3 are false, the process ends. If the result of at least one of the condition determinations is true, the process proceeds to step S43. The processing unit 130 does not perform the operations of step S43 and the subsequent steps for the rule which obtained false as the result of the condition determination of step S42. Takin the event record 220 as an example, "temp=22". Accordingly, the result of the pre-filter of the rule r2 is false, and the result of the pre-filter of the rule r3 is true. Thus, among the rules r2 and r3, only the rule r3 is subjected to the operations of the subsequent steps.

(Step S43) The processing unit 130 determines whether a JOIN operation is included in the rule corresponding to the event type of the received event record, based on the control table 114a. If a JOIN operation is included, the process proceeds to step S44. If a JOIN operation is not included, the process proceeds to step S47. For example, as mentioned above, the rule corresponding to the event record 210 is the rule r1. For the rule r1, information indicating a JOIN operation is registered in the item "JOIN" of the control table 114a. Accordingly, the processing unit 130 determines that there is a JOIN operation for the event record 210. Note that, in the case where the condition determination of the pre-filter is performed in step S42, the rule that is subjected to the determination of step S43 is only the rule which obtained true as the determination result of its pre-filter.

(Step S44) The JOIN unit 132 executes the JOIN operation in the control table 114a, for the rule that is determined to include a JOIN operation in step S43. The execution result of the JOIN operation is held in the RAM 102 until the event processing for the received event record ends.

(Step S45) The processing unit 130 determines whether an after-filter is included in the rule for which a JOIN operation is performed in step S44, based on the control table 114a. If an after-filter is included, the process proceeds to step S46. If an after-filter is not included, the process proceeds to step S47. For example, it is assumed that a JOIN operation corresponding to the rule r1 is executed in step S44 for the event record 210. In this case, for the rule r1, no information is set in the item "After-Filter" of the control table 114a. Accordingly, the processing unit 130 determines that there is no after-filter for the event record 210. Further, for example, it is assumed that a JOIN operation corresponding to the rule r3 is executed in step S44 for the event record 220. In this case, for the rule r3, information indicating an operation of a condition determination is registered in the item "After-Filter" of the control table 114a. Accordingly, the processing unit 130 determines that there is an after-filter for the event record 220.

(Step S46) The after-filter unit 133 executes the condition determination of the after-filter in the control table 114a, for the rule that is determined to include an after-filter in step S45. The after-filter unit 133 determines whether the result of the condition determination is true. If the result of the condition determination is true, the process proceeds to step S47. If the result of the condition determination is false, the process ends.

(Step S47) The processing unit 130 determines whether a main operation is included in the rule corresponding to the event type of the received event record, based on the control table 114a. If a main operation is included, the process proceeds to step S48. If a main operation is not included, the process ends. Note that, in the case where the condition determination of the pre-filter is performed in step S42, the rule that is subjected to the determination of step S47 is only the rule which obtained true as the determination result of its pre-filter, as mentioned above.

(Step S48) The main operation unit 134 determines, for the rule that is determined to include a main operation in step S47, whether a condition determination is included in the main operation. If a condition determination is included in the main operation, the process proceeds to step S49. If a condition determination is not included in the main operation, the process proceeds to step S50.

(Step S49) The main operation unit 134 evaluates the condition determination in the main operation, and determines whether the evaluation result is true. If the evaluation result is true, the process proceeds to step S50. If the evaluation result is false, the process ends.

(Step S50) The main operation unit 134 executes a subsequent operation in the main operation. Examples of subsequent operations in the main operation include an operation that calls an exit operation and generates the event record 310. Examples of subsequent operations may also include an operation that transmits the event record 310 to the air conditioner 60 to be controlled. In another example, the action taken by the main operation unit 134 with respect to r1 is to set the value "P.pow" included in the event in the window "Home.pow" as the power consumption of the corresponding house.

In this way, upon receiving an event record, the processing unit 130 executes an operation corresponding to the event record in accordance with the procedure registered in the control table 114a.

Figure 20:
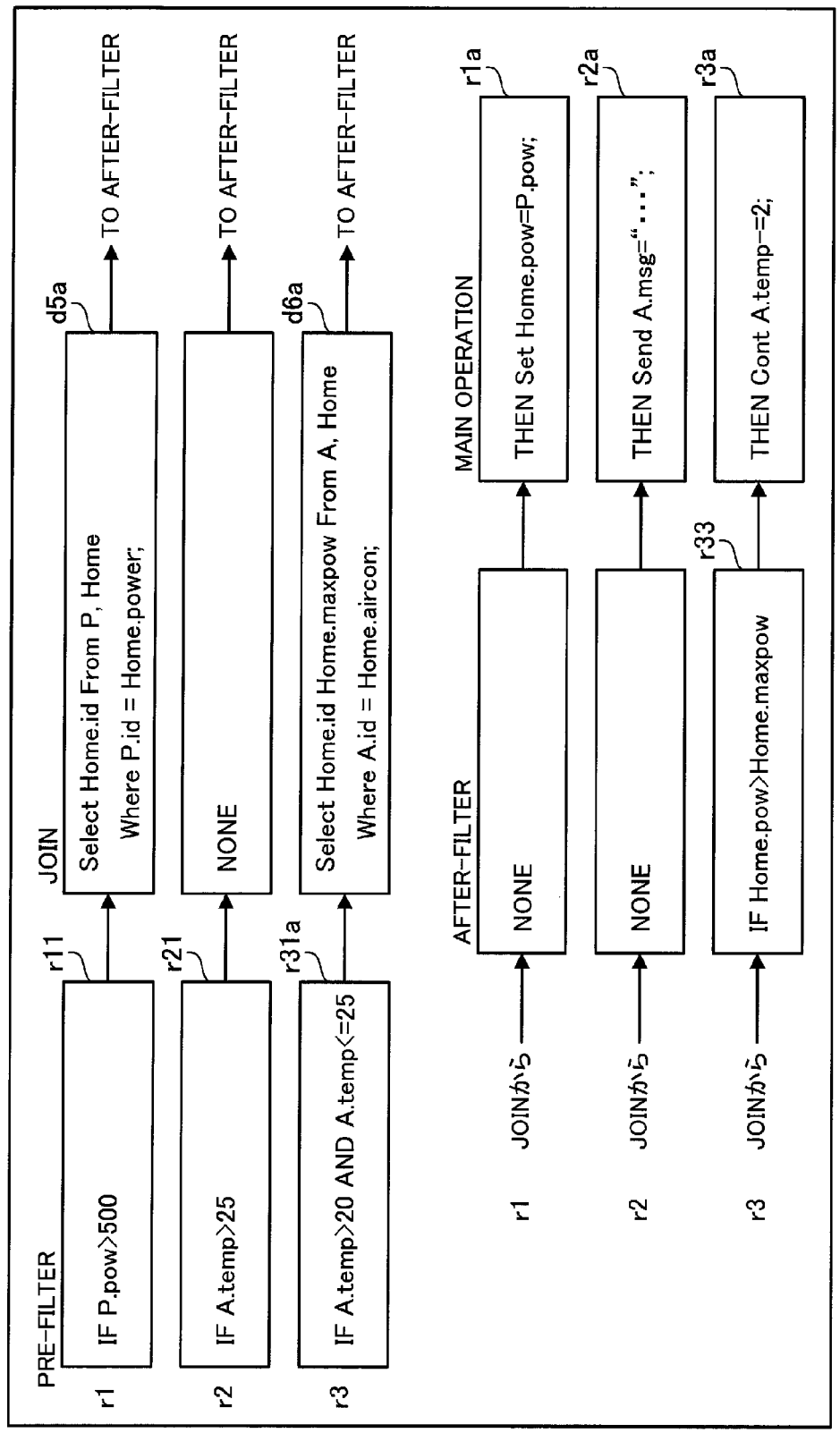
FIG. 20 illustrates an example of event processing according to the second embodiment.

FIG. 20 illustrates an example of event processing according to the second embodiment. FIG. 20 depicts the processing order in which the rules r1, r2, and r3 are processed while dividing and allocating each of the rules r1, r2 and r3 to the pre-filter, the JOIN, the after-filter, and the main operation, based on the control table 114a created for the rule set 112. Note that, in FIG. 20, a string "IF" or a string "THEN" is added to information indicating each operation. Further, in the case where a JOIN or an after-filter is not registered, "NONE" is indicated in the corresponding field.

For example, it is assumed that the event record 210 is input from the power consumption meter 50 to the server 100. Since the event type of the event record 210 is "P", the rule r1 corresponding to the event type "P" is executed. In this case, the operations indicated by the minimum parts of the rule r1 are executed in the following order, based on the control table 114a.

(1) The pre-filter unit 131 executes a condition determination corresponding to the condition determination portion r11. In the event record 210, since "P.pow=1510", the processing result of the condition determination portion r11 is true. Accordingly, the subsequent operation by the JOIN unit 132 is executed.

(2) The JOIN unit 132 executes a rule d5a. The rule d5a is a rule describing a JOIN operation obtained by optimizing the rule d5. As the execution result of the rule d5a, "Home.id=0001" is obtained. There is no after-filter for the rule r1. Accordingly, processing by the after-filter unit 133 is skipped, and the subsequent operation by the main operation unit 134 is executed.

(3) The main operation unit 134 executes an operation corresponding to the main operation portion r1a. More specifically, the main operation unit 134 executes "Set Home.pow=P.pow", using the "Home.id" obtained as the JOIN result by the JOIN unit 132. As a result, "P.pow=1510" is set in a window "Home(0001).pow" specified by "Home.id=0001".

It is assumed that, after the event record 210, the event record 220 is input from the air conditioner 60 to the server 100. Since the event type of the event record 220 is "A", the rules r2 and r3 corresponding to the event type are executed. In this case, the operations indicated by the minimum parts of the rules r2 and r3 are executed in the following order, based on the control table 114a.

First, a description will be given of the rule r2.

(1) The pre-filter unit 131 executes a condition determination corresponding to the condition determination portion r21. In the event record 310, since "A.temp=22", the processing result of the condition determination portion r21 is false. Accordingly, the processing of the rule r2 for the event record 220 ends at the pre-filter unit 131.

Next, a description will be given of the rule r3.

(1) The pre-filter unit 131 executes a condition determination corresponding to a condition determination portion r31a. Here, "A.temp >20 AND A.temp <=25" described in the condition determination portion r31a is obtained by merging the condition determination portions r31 and r32 of the rule r3 for the pre-filter. In the event record 220, since "A.temp=22", the processing result of the condition determination portion r31a is true. Accordingly, the subsequent operation by the JOIN unit 132 is executed.

(2) The JOIN unit 132 executes a rule d6a. The rule d6a his a rule describing a JOIN operation obtained by optimizing the rule d6. As the execution result of the rule d6a, "Home.id=0001" and "Home.maxpow=1500" are obtained.

(3) The after-filter unit 133 executes the condition determination portion r33"Home.pow>Home.maxpow", using the "Home.id" and "Home.maxpow" obtained as the JOIN result by the JOIN unit 132. In accordance with the input event record 210, the value of the window "Home(0001).pow" specified by "Home.id=0001" has been set to "1510". Accordingly, the processing result of the condition determination portion r33 is true. Thus, the subsequent operation by the main operation unit 134 is executed.

(4) The main operation unit 134 executes an operation corresponding to the main operation portion r3a. More specifically, the main operation unit 134 generates the event record 310 for controlling the temperature setting of the air conditioner 60 to be lowered by 2° C. The server 100 transmits the generated event record 310 to the air conditioner 60.

In this way, each of the rules included in the definition rule 112a and the processing rule 112b is divided and allocated to the pre-filter, the JOIN, the after-filter, and the main operation. Thus, it is possible to control the order of operations for an event record so as to prevent a JOIN operation or a main operation from being executed uselessly.

FIG. 21 illustrates a comparative example (No. 1) of a rule set. A rule set 115 describes operations equivalent to those of the rule set 112. The rule set 115 includes rules r101, r102, r103, r104, and r105.

The rule r101 is a rule that is described so as to execute a JOIN operation corresponding to the rule d5 when an event record of the event type "P" is received. The rule r102 is a rule that is described so as to execute a JOIN operation corresponding to the rule d6 when an event record of the event type "A" is received.

The rule r103 is a rule describing the same operations as the rule r1. The rule r104 is a rule describing the same operations as the rule r2. The rule r105 is a rule describing the same operations as the rule r3.

As a method of describing rules, a rule may be described so as to execute a subsequent operation (THEN clause) when a certain condition (IF clause) is satisfied, as in the case of the rule set 115. However, if event processing is performed based on the rule set 115 without performing rule allocation of the second embodiment, a JOIN operation might be executed uselessly. The following is a specific example.

For example, in the case where an event record of the event type is received, the rule r103 is executed after the rule r101 is executed. In this case, if the condition determination portion of the rule r103 is false, the subsequent operation of the rule r103 (that uses the JOIN result of the rule r101) is not executed. Further, there is no rule related to the event type "P" in the operations following the rule r103. That is, in this case, the JOIN operation is executed uselessly in the rule r103. Further, since the JOIN operation of r101 is "Select *", values not needed in the subsequent operations are obtained. This increases not only the processing time but also the memory usage. These issues also occur in the case where an event record of the event type "A" is received.

In particular, the JOIN operation imposes a high processing load, and therefore needless execution of the JOIN operation might greatly affect the response delay to each event.

FIG. 22 illustrates a comparative example (No. 2) of a rule set. A rule set 116 describes operations equivalent to those of the rule set 112. In the rule set 116, rules are described using a predetermined event processing language (EPL) in an ESPER, which is a tool for CEP. The rule set 116 includes rules r111, r112, r113, r114, r115, and r116.

The rule r111 is a rule describing the same definition as the rule d1. The rule r112 is a rule describing the same definition as the rule d2. The rule r113 is a rule describing the same definition as the rule d4.

The rule r114 is a rule in which the operations corresponding to the rules d5 and r1 are combined. In the rule r114, a clause specified by "from" in the second line is evaluated first. More specifically, after the JOIN operation corresponding to the rule d5 is executed for an event of the event type "P", the operation corresponding to the rule r1 is executed.

The rule r115 is a rule describing the same operations as the rule r2.

The rule r116 is a rule in which the operations corresponding to the rules d6 and r3 are combined. More specifically, after the JOIN operation corresponding to the rule d6 is executed for an event of the event type "A", the operation corresponding to the rule r3 is executed.

As a method of describing rules, there may be a method used for describing the rule set 116. However, if event processing is performed based on the rule set 116 without performing rule allocation of the second embodiment, a JOIN operation might be executed uselessly. The following is a specific example.

For example, in the case of the description of the rule r114, a JOIN corresponding to the rule d5 is always executed for the event type "P". However, if the subsequent determination "P(pow>500) as p" corresponding to the condition determination potion r11 is false, the subsequent operation "insert into HomePowerWindow select h.Home as homeId, p.pow as pow" corresponding to the subsequent main operation portion r1a is not executed. That is, in this case, the JOIN operation is executed uselessly in the rule r114.

Further, for example, in the case of the description of the rule r116, the JOIN corresponding to the rule d6 is always executed first for the event type "A". However, if the subsequent determination "a.temp>20 and a.temp<=25" corresponding to the condition determination potion r31a is false, the subsequent operation "select a.id, a.temp-2 as temp" corresponding to the subsequent main operation portion r3a is not executed. That is, in this case, the JOIN operation is executed uselessly in the rule r116.

As in the case of the rule set 116, there are EPLs that may generate a useless JOIN depending on the description method. In the case of such EPLs, whether a useless JOIN is generated during event processing is dependent on the consideration by a person who creates the rule. Further, in the case of using such EPLs, the processing load on a CEP engine for sequentially executing the procedure described in the rule might be increased.

FIG. 23 illustrates an example of an event count table according to the second embodiment. An event count table 400 illustrates the number of output events with respect to the number of input events in the pre-filter, JOIN, after-filter, and main operation in the case where the event processing method of the second embodiment is applied to the input event records. The event count table 400 also illustrates, as a comparative example, the number of events that are processed in the case where event processing is performed using either one of the rule sets 115 and 116 without performing rule allocation of the second embodiment. The event count table 400 includes the following items: Event, Distribution, %, Input, Pre-Filter, JOIN, After-Filter, Main Operation, and Exit Operation.

The item "Event" indicates the type of an event. There are two types of events, namely, "P" and "A", in this example. It is assumed that event records of any event are received at a frequency of 1,000,000 events/sec. Note that the row immediately below the row of the event A is a row indicating the total number of processed events P and events A. Since the frequency of each of the event P and the event A is 1,000,000 events/sec, the total frequency of the two events is 2,000,000 events/sec. Further, the row directly below the row indicating the total is a row indicating the number of processed events in the comparative example (in which rule allocation of the second embodiment is not performed).

The item "Distribution" indicates the distribution of values of each event. As for the event P, the distribution of power consumption is divided into the following ranges: a range of pow>1500 (Wh); a range of 500 (Wh)<pow≤1500 (Wh); and a range of pow≤500 (Wh). As for the event A, the distribution of temperature is divided into the following ranges: a range of temp>25 (° C.); a range of temp 20 (° C.)<temp≤25 (° C.); and a range of temp≤20 (° C.).

The item "%" indicates a value representing the percentage of event records in each range with respect to the received event records. The item "Input" indicates a value representing the number of input events per second in each range with respect to the total number of events on a per-type basis.

More specifically, as for the event P, the event records belonging to pow>1500 (Wh) account for 10%. Thus, the number of input events is 1,000,000×0.1=100,000 events/sec. The event records belonging to 500 (Wh)<pow≤1500 (Wh) account for 20%. Thus, the number of input events is 1,000,000×0.2=200,000 events/sec. The event records belonging to pow≤500 (Wh) account for 70%. Thus, the number of input events is 1,000,000×0.7=700,000 events/sec.

As for the event A, the event records belonging to temp>25 (° C.) account for 10%. Thus, the number of input events is 1,000,000×0.1=100,000 events/sec. The event records belonging to 20 (° C.)<temp 25 (° C.) account for 20%. Thus, the number of input events is 1,000,000×0.2=200,000 events/sec. The event records belonging to temp≤20 (° C.) account for 70%. Thus, the number of input events is 1,000,000×0.7=700,000 events/sec.

Note that, in the comparative example, both the events P and events A are input at the same frequencies as those described above. In the comparative example, the number of input events is 2,000,000 events/sec. Further, in the row indicating the total, "-" (hyphen) is indicated in the items "Distribution" and "%".

In the items "Pre-Filter", "JOIN", "After-Filter", "Main Operation", and "Exit Operation", the number of events processed in each stage and obtained as the processing results is indicated. In the case where there is no corresponding operation or in the case where the subsequent operation is not executed due to the operation of the preceding operation, "-" (hyphen) is indicated in the corresponding item.

As for the event P, for example, processing of the rule r1 is executed in each distribution range in the following way.

(1) As for 100,000 events/sec belonging to pow>1500 (Wh), 100,000 events/sec are processed by the pre-filter. Thus, "true" is determined for 100,000 events/sec. Then, 100,000 events/sec are processed by the JOIN. Thus, the JOIN results of 100,000 events/sec are obtained. Then, 100,000 events/sec are processed by the main operation. Thus, the main operation results of 100,000 events/sec are obtained.

(2) As for 200,000 events/sec belonging to 500 (Wh)< pow≤1500 (Wh), 200,000 events/sec are processed by the pre-filter. Thus, "true" is determined for 200,000 events/sec. Then, 200,000 events/sec are processed by the JOIN. Thus, the JOIN results of 200,000 events/sec are obtained. Then, 200,000 events/sec are processed by the main operation. Thus, the main operation results of 200,000 events/sec are obtained.

(3) As for 700,000 events/sec belonging to pow 500 (Wh), 700,000 events/sec are processed by the pre-filter. Thus, "true" is determined for 0 event/sec. That is, none of the event record passes through the pre-filter. Accordingly, the subsequent operations are not executed for these event records.

Further, as for the event A, processing of the rules r2 and r3 are executed in each distribution range in the following way.

(1) As for 100,000 events/sec belonging to temp>25 (° C.), 100,000 events/sec are processed by the pre-filter. Thus, "true" is determined for 100,000 events/sec with respect to the condition determination portion r21 of the rule r2. Then, in the main operation, 100,000 events/sec are processed with respect to the condition determination portion r2a. Thus, the main operation results of 100,000 events/sec are obtained. As an exit operation, an operation of controlling the air conditioner (an operation of displaying a recommendation message) is performed for 100,000 events/sec in accordance with the result of the main operation.

(2) As for 200,000 events/sec belonging to 20 (° C.)< temp≤25 (° C.), 200,000 events/sec are processed by the pre-filter. Thus, "true" is determined for 200,000 events/sec with respect to the condition determination portion r31a of the rule r3. Then, 200,000 events/sec are processed by the JOIN. Thus, the JOIN results of 200,000 events/sec are obtained. Then, 200,000 events/sec are processed by the after-filter. Thus, "true" is determined for 20,000 events/sec with respect to the condition determination portion r33. Then, in the main operation, 20,000 events/sec are processed with respect to the main operation portion r3a. Thus, the main operation results of 20,000 events/sec are obtained. As an exit operation, an operation of controlling the air conditioner (an operation of lowering the temperature setting by 2° C.) is performed for 20,000 events/sec in accordance with the result of the main operation.

(3) As for 700,000 events/sec belonging to temp≤20 (° C.), 700,000 events/sec are processed by the pre-filter, and "true" is determined for none of the event records with respect to the condition determination portion r21 and the condition determination portion r31a. That is, none of the event records passes through the pre-filter. Accordingly, the subsequent operations are not executed for these event records.

To summarize these counts in terms of the total event frequency, the input records of 2,000,000 events/sec are reduced to 600,000 events/sec by the pre-filter. Among 600,000 events/sec, the number of events to be subjected to a JOIN is 500,000 events/sec. Further, among 200,000 events/sec to be subjected to a JOIN of the rule r3, the number of events to be subjected to a main operation is reduced to 20,000 events/sec by the after-filter. As a result, the total number of events to be subjected to a main operation is reduced to 420,000 events/sec. Among those, events to be subjected to an exit operation based on the rules r2 and r3 are 120,000 events/sec.

On the other hand, in the comparative example, among the input records of 2,000,000 events/sec, the number of events to be subjected to a JOIN is 2,000,000 events/sec. This is because, as mentioned above with respect to the rule sets 115 and 116, the JOIN is always executed once for each event P, and the JOIN is always executed once for each event A. Then, the main operation indicated by each rule is executed once for each JOIN. For example, as for the rule set 115, the main operations correspond to the rule r103 (event P) and the rule r105 (event A).

Further, as for the rule set 116, the main operations for the event P correspond to "P(pow>500) as p;" and "insert into HomePowerWindow select h.Home as homeId, p.pow as pow" of the rule r114. Further, as for the rule set 116, the main operations for the event A correspond to "where hpw.homeId=h.Home and a.temp>20 and a.temp<=25 and hpw.pow>h.Maxpow" and "select a.id, a.temp-2 as temp" of the rule r116.

In the case of the rule set 116, if the number of rules is further increased, since each rule describes a JOIN operation that is needed, a JOIN operation might be executed multiple times for a single event.

In the comparative example, as the result of the main operation, the final number of events subjected to an exit operation is 120,000 events/sec.

By performing the rule allocation of the second embodiment, the number of events subjected to a JOIN operation is reduced to 500,000 events/sec compared to the 2,000,000 events/sec of the case where rule allocation is not performed. This is because the pre-filter reduces, in advance, the number of events to be subjected to a JOIN operation. Further, the number of events to be subjected to a main operation is reduced to 420,000 events/sec. This is because the after-filter reduces, in advance, the number of events to be subjected to a main operation.

In this way, the server 100 is able to efficiently reduce the number of operations to be executed for the rule set 112. As a result, the number of operations to be executed for each event is reduced, so that the number of events processable per unit time is increased. Further, since the backlog of other events due to generation of a useless operation is reduced, it is possible to reduce the delay in executing an operation in response to generation of an event. In particular, it is possible to reduce the number or operations, such as a JOIN, that impose a high processing load. This greatly contributes acceleration. Thus, it is possible to increase the response speed in CEP.

Further, by performing rule allocation, filtering operations and other operations may be implemented in a clearly separated manner. Since it is possible to separate the filtering operation portions, the filtering operation portions (the pre-filter unit 131 and the after-filter unit 133) may be implemented with a dedicated module (condition determination unit) that performs processing at high speed using a register. Therefore, it is possible to easily realize a CEP engine capable of performing a condition determination for an event at high speed.

Further, the allocating unit 120 automatically creates the control table 114a (or the control table 114) based on the rule set 112. Therefore, even if the creator of rules describes a processing procedure with a low processing efficiency (such as one that executes a JOIN uselessly) as illustrated in the rule sets 115 and 116, it is possible to efficiently perform event processing, based on the control table 114a (or the control table 114). Thus, the creator of rules is not forced to create rules while taking the processing procedure into consideration. Accordingly, it is possible to reduce the effort that the creator has to make to create rules.

Further, the allocating unit 120 allows the definition rule 112a and the processing rule 112b to be input individually as illustrated in the rule set 112. Thus, the creator of rules may describe definition portions and processing portions in a clearly separated manner. Therefore, the creator of rules may describe rules more efficiently. This is because, the content that is generally used by the processing rule 112b may all be described in the definition rule 112a. Thus, it is possible to describe a condition determination using the result of a JOIN operation in the processing rule 112b, without describing a definition of the JOIN operation in the processing rule 112b. Therefore, it is possible to reduce the number of rules to be described, and thus to reduce the effort needed for the task of creation involved in creating rules.

Further, in the processing rule 112b, each rule may be described in a short sentence including a condition portion and a processing portion, using "IF", "THEN", and the like. This makes it possible to describe a processing rule that is easy to write and is easy to maintain.

Note that not only the rule set 112, but also the rule sets 115 and 116 may be input in the allocating unit 120. The allocating unit 120 is capable of creating a control table 114a for the rule sets 115 and 116 in the same way as in the case of the rule set 112. For example, as for the rule set 115, a condition determination portion, a main operation portion, a JOIN operation, and so on may be identified based on fixed phrases such as "IF", "THEN", and so on, in the same way as in the case of the rule set 112. Likewise, as for the rule set 116, a condition determination portion, a main operation portion, a JOIN operation, and so on may be identified based on fixed phrases such as "from", "insert", "select", "sql", "where", and so on.

Further, even if the processing load of the main operation is high, the entire processing performance is ensured by a reduction in the number of operations. Therefore, even if the processing capacity of the server is relatively low, the needed processing performance is more likely to be achieved. This makes it is possible to lower the processing capacity that the server needs to have, and to provide advantages in terms of cost.

Further, in the second embodiment, an example has been described in which the operation of the air conditioner 60 is controlled in response to events from the power consumption meter 50 and the air conditioner 60. However, event processing may be performed for the mobile terminal apparatus 40, the mobile phone 70, and the domestic power management apparatus 80, in the same way. Further, in the second embodiment, an example has been described in which control operations related to home appliances are performed. However, the event processing method of the second embodiment may be applied to other information processing systems. Examples of other information processing systems may include an information processing system that executes an operation corresponding to an event issued by medical equipment in hospitals. Examples of other information processing systems may also include an information processing system that executes an operation corresponding to an event issued by commercial equipment in factories.

As described above, according to the server 100 of the second embodiment, it is possible to process events efficiently. Further, it is possible to support such event processing efficiently.

(Third Embodiment)

Hereinafter, a third embodiment will be described. The following mainly describes the differences from the second embodiment, and description of the common features will not be repeated.

In the second embodiment, an example has been described in which the processing order is controlled and operations are executed for the received event records while referring to the control table 114a. On the other hand, in order to accelerate event processing, the content of the control table 114a or the external data may be expanded in the RAM 102 in advance as structures (or objects) and links between the structures. Thus, event processing may be performed while referring these structures and links as control information. In the third embodiment, a method for doing so is described.

An information processing system and apparatuses of the third embodiment are the same as the information processing system of the second embodiment illustrated in FIG. 2. Further, the example of the hardware and software of a server of the third embodiment is the same as the example of the hardware and software of the server 100 of the second embodiment illustrated in FIGS. 3, 4, and 7. Accordingly, the apparatuses of the third embodiment are denoted by the same names and reference signs as those of the second embodiment.

The third embodiment differs from the second embodiment in that the allocating unit 120 expands the content of the control table 114a or the external data in advance as structures and links between the structures in the RAM 102. Further, the third embodiment differs from the second embodiment in that the processing unit 130 performs event processing based on these expanded structures and links between the structures.

FIG. 24 illustrates an example of a rule structure according to the third embodiment. A rule structure 500 is a structure used when expanding the control table 114a in the RAM 102. The following describes the content using the line numbers that are assigned to the lines of the rule structure 500 for descriptive purposes.

The line with the line number "1" indicates that this is a definition of a structure "rule". The lines with the line number "1" through the line number "7" are the definition content of the structure "rule".

In the line with the line number "2", "char *rule;" defines the rule number. The rule number is assigned in order to facilitate identifying which rule each of the rule structures expanded in the RAM 102 is related to.

In the line with the line number "3", "char *type;" defines the type of the rule. As the type, information for identifying a pre-filter, a JOIN, an after-filter, a main operation, or the like is registered.

In the line with the line number "4", "char *item;" defines the rule body. As the rule body, information indicating an operation of a condition determination, information indicating a main operation, or the like is registered.

In the line with the line number "5", "RULE *to" is a pointer indicating a link to the next rule structure to be referred to.

In the line with the line number "6", "VALUE value [ ];" defines a value structure storing auxiliary information used in an operation in the "item".

In the line with the line number "7", "RULE" defines another name of the structure "rule".

FIG. 25 illustrates an example of a value structure according to the third embodiment. A value structure 501 is a structure used when expanding the auxiliary information of the rule structure 500 in the RAM 102. The following describes the content using the line numbers that are assigned to the lines of the value structure 501 for descriptive purposes.

The line with the line number "1" indicates that this is a definition of a structure "value". The lines with the line number "1" through the line number "4" are the definition content of the structure "value".

In the line with the line number "2", "char v;" is a value of auxiliary information.

In the line with the line number "3", "void *p" is a pointer indicating a link to a rule structure or the like corresponding to the value of the auxiliary information.

In the line with the line number "4", "VALUE" defines another name of the structure "value".

Figure 26:
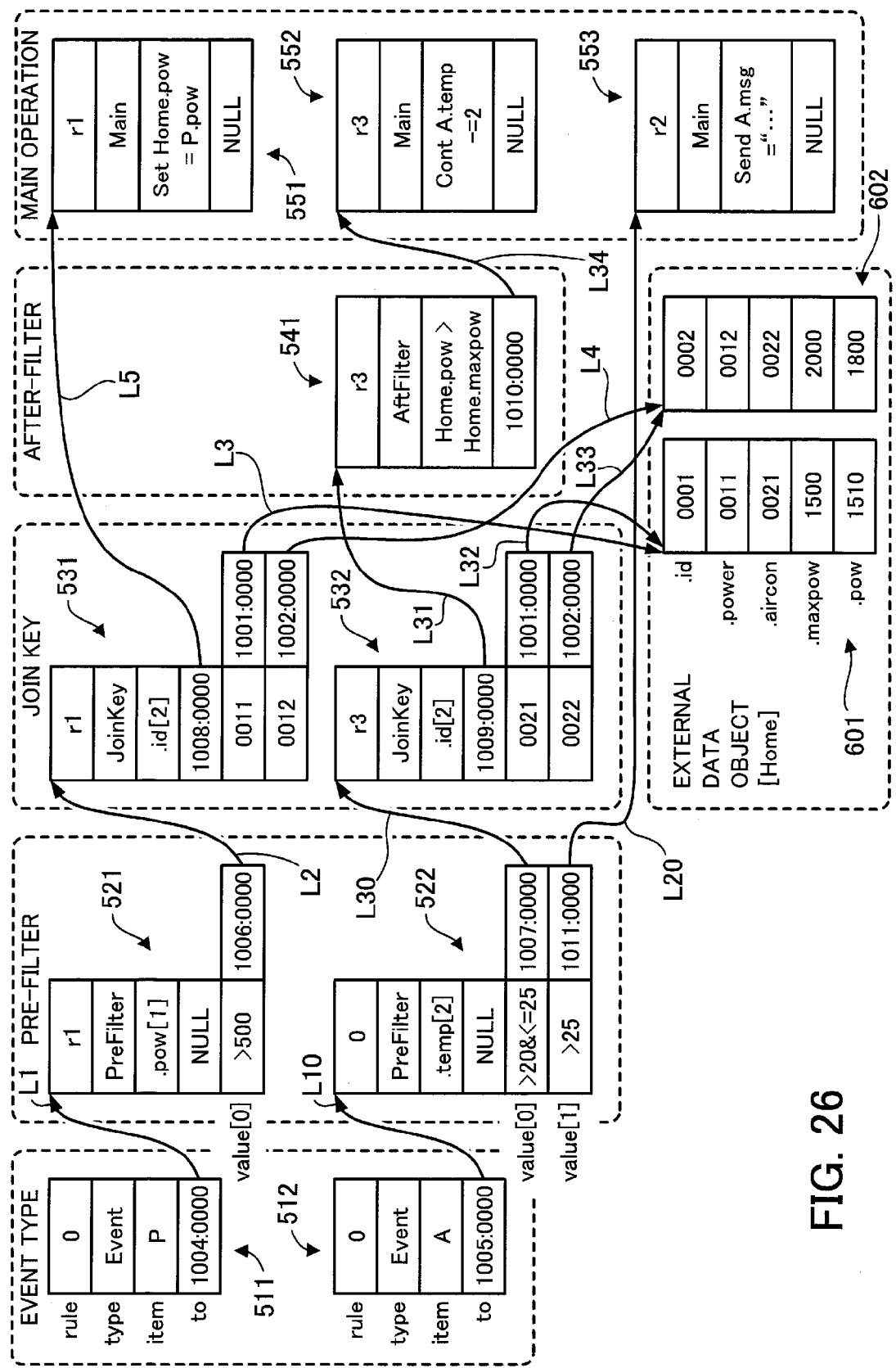
FIG. 26 illustrates an example of expanding a control table according to the third embodiment.

FIG. 26 depicts an example of expanding a control table according to the third embodiment. FIG. 26 illustrates a data structure in the case where the control table 114a and external data are expanded in the RAM 102, using the rule structure 500 and the value structure 501.

Rule structures 511 and 512 are structures each storing information on an event type. The rule structure 511 indicates the event type "P" corresponding to the rule r1. The rule structure 512 indicates the event type "A" corresponding to the rules r2 and r3.

For example, the rule structure 511 stores the following values. The "rule" value is "0". This is because the rule structure 511 may be used by a plurality of processing rules. The "type" value is "Event". This "type" value indicates that the structure is a structure of an event type. The "item" value is "P". This is because the structure is a structure of the event type "P". The "to" value is "1004:0000". This value is the head address of a next rule structure 521 to be referred to, and is a link L1 to the rule structure 521.

Likewise, as for the rule structure 512, the "rule" value is "0". The "type" value is "Event". The "item" value is "A". This is because the structure is a structure of the event type "A". The "to" value is "1005:0000". This is a link L10 to a next rule structure 522.

The rule structures 521 and 522 are structures each storing information on a pre-filter. The rule structure 521 is a structure storing information on the pre-filter of the rule r1 (No. "r1") in the control table 114a. The rule structure 522 is a structure storing information on the pre-filters of the rules r2 and r3 (Nos. "r2" and "r3") in the control table 114a.

For example, the rule structure 521 stores the following values. The "rule" value is "r1". This is because the pre-filter corresponds to only the rule r1. The "type" value is "PreFilter". This "type" value indicates that the structure is a structure of a pre-filter. The "item" value is ".pow[1]". This is because a single type of condition determination corresponding to the "pow" value of the event record of the event type "P" is included. The "to" value is "NULL". This is because a link to the next rule structure is stored in a value structure.

The "v" value of a value structure (value[0]) corresponding to the rule structure 521 is ">500". This is a definition of the specific comparison value and comparison method for the above "pow" value, and corresponds to the condition determination portion r1b of the rule r1. The "p" value is "1006:0000". This is a link L2 to a next rule structure 531 to be referred to if the result of the condition determination by the "v" value is true.

Further, the rule structure 522 stores the following values. The "rule" value is "0". This is because the rule structure 522 may be used by either of the rules r2 and r3. The "type" value is "PreFilter". The "item" value is ".temp[2]". This is because two types of condition determinations corresponding to the "temp" value of the event record of the event type "A" are included. The "to" value is "NULL". This is because a link to the next rule structure is stored in a value structure.

The first value of a value structure (value[0]) corresponding to the rule structure 522 is ">20 &<=25". This corresponds to the condition determination portion r31a of the rule r3. The first "p" value corresponding to the first "v" value is "1007:0000". This is a link L30 to a next rule structure 532 to be referred to if the result of the condition determination by the first "v" value is true. Further, the second "v" value of a value structure (value[1]) corresponding to the rule structure 522 is ">25". This corresponds to the condition determination portion r21 of the rule r2. The second "p" value corresponding to the second "v" value is "1011:0000". This is a link L20 to a next rule structure 553 to be referred to if the result of the condition determination by the second "v" value is true.

The rule structures 531 and 532 are structures each storing information on a JOIN (referred to as a JOIN key). The rule structure 531 is a structure storing a JOIN key of the rule r1 in the control table 114a. The rule structure 532 is a structure storing a JOIN key of the rule r3 in the control table 114a.

For example, the rule structure 531 stores the following values. The "rule" value is "r1 ". The "type" value is "JoinKey". This "type" value indicates that the structure is a structure of a JOIN key. The "item" value is ".id[2]". This is because two IDs are registered as IDs of power consumption meters (corresponding to the item "power") in the home table 111, and these two IDs may be included in event records from power consumption meters. The "to" value is "1008:0000". This is a link L5 to a next rule structure 551.

The first "v" value of a value structure corresponding to the rule structure 531 is "0011". This is the ID of the power consumption meter 50. The first "p" value corresponding to the first "v" value is "1001:0000". This is a link L3 to an external data object 601 to be referred to when an event record including this first "v" value is received. Further, the second "v" value of a value structure corresponding to the rule structure 531 is "0012". The second "p" value corresponding to the second "v" value is "1002:0000". This is a link L4 to an external data object 602 to be referred to when an event record including this second "v" value is received.

Further, the rule structure 532 stores the following values. The "rule" value is "r3". This is because this JOIN key corresponds to only the rule r3. The "type" value is "JoinKey". The "item" value is ".id[2]". This is because two IDs are registered as IDs of air conditioners (corresponding to the item "aircon") in the home table 111, and these two IDs may be included in event records from air conditioners. The "to" value is "1009:0000". This is a link L31 to a next rule structure 541.

The first "v" value of a value structure corresponding to the rule structure 532 is "0021". This is the ID of the air conditioner 60. The first "p" value corresponding to the first "v" value is "1001:0000". This is a link L32 to the external data object 601 to be referred to when an event record including this first "v" value is received. Further, the second "v" value corresponding to the rule structure 532 is "0022". The second "p" value corresponding to the second "v" value is "1002:0000". This is a link L33 to the external data object 602 to be referred to when an event record including this second "v" value is received.

The external data objects 601 and 602 are objects obtained by expanding the respective records of the home table 111 in the RAM 102. Each of the external data objects 601 and 602 includes variables Home.id, Home.power, Home.aircon, and Home.maxpow, corresponding to the respective items of the home table 111, and holds registered values of the corresponding record. Further, each of the external data objects 601 and 602 includes an item (Home.pow) corresponding to the window, and holds the value registered in the window. The external data object 601 corresponds to the record with the id "0001" in the home table 111. The external data object 602 corresponds to the record with the id "0002" in the home table 111.

The rule structure 541 is a structure storing information on the after-filter of the rule r3. For example, the rule structure 541 stores the following values. The "rule" value is "r3". The "type" value is "AftFilter". This "type" value indicates that the structure is a structure of an after-filter. The "item" value is "Home.pow>Home.maxpow". This corresponds to the condition determination portion r33 of the rule r3. The "to" value is "1010:0000". This is a link L34 to a next rule structure 552 to be referred to if the result of the condition determination of the "item" value is true.

The rule structures 551, 552, and 553 are structures each storing information on a main operation. The rule structure 551 is a structure storing information on the main operation of the rule r1 in the control table 114a. The rule structure 552 is a structure storing information on the main operation of the rule r3 in the control table 114a. The rule structure 553 is a structure storing information on the main operation of the rule r2 in the control table 114a.

For example, the rule structure 551 stores the following values. The "rule" value is "r1". The "type" value is "Main". This "type" value indicates that the structure is a structure of a main operation. The "item" value is "Set Home.pow=P.pow". This corresponds to the main operation portion r1a of the rule r1. The "to" value is "NULL". This is because the next destination to be referred to does not exist.

Further, the rule structure 552 stores the following values. The "rule" value is "r3". The "type" value is "Main". The "item" value is "Cont A.temp -=2". This corresponds to the main operation portion r3a of the rule r3. The "to" value is "NULL".

Further, the rule structure 553 stores the following values. The "rule" value is "r2". This is because the main operation corresponds to only the rule r2. The "type" value is "Main". The "item" value is "Send A.msg=" . . . "". This corresponds to the main operation portion r2a of the rule r2. The "to" value is "NULL".

In the manner described above, the allocating unit 120 expands the pre-filter, the JOIN operation, the after-filter, and the main operation in the RAM 102, using the above-described data structure including the content of each operation and a pointer that indicates information indicating the next operation in accordance with the result of the operation.

Next, a description will be given of the procedure of the third embodiment. The procedure of the entire process of the third embodiment is the same as the procedure of the process of the second embodiment illustrated in FIG. 15. However, the third embodiment differs from the second embodiment in the procedure of expanding rules and external data in the RAM 102 in step S12. Further, the third embodiment differs from the second embodiment in the producer of event processing in step S15. Thus, the following describes these operations in detail.

Figure 27:
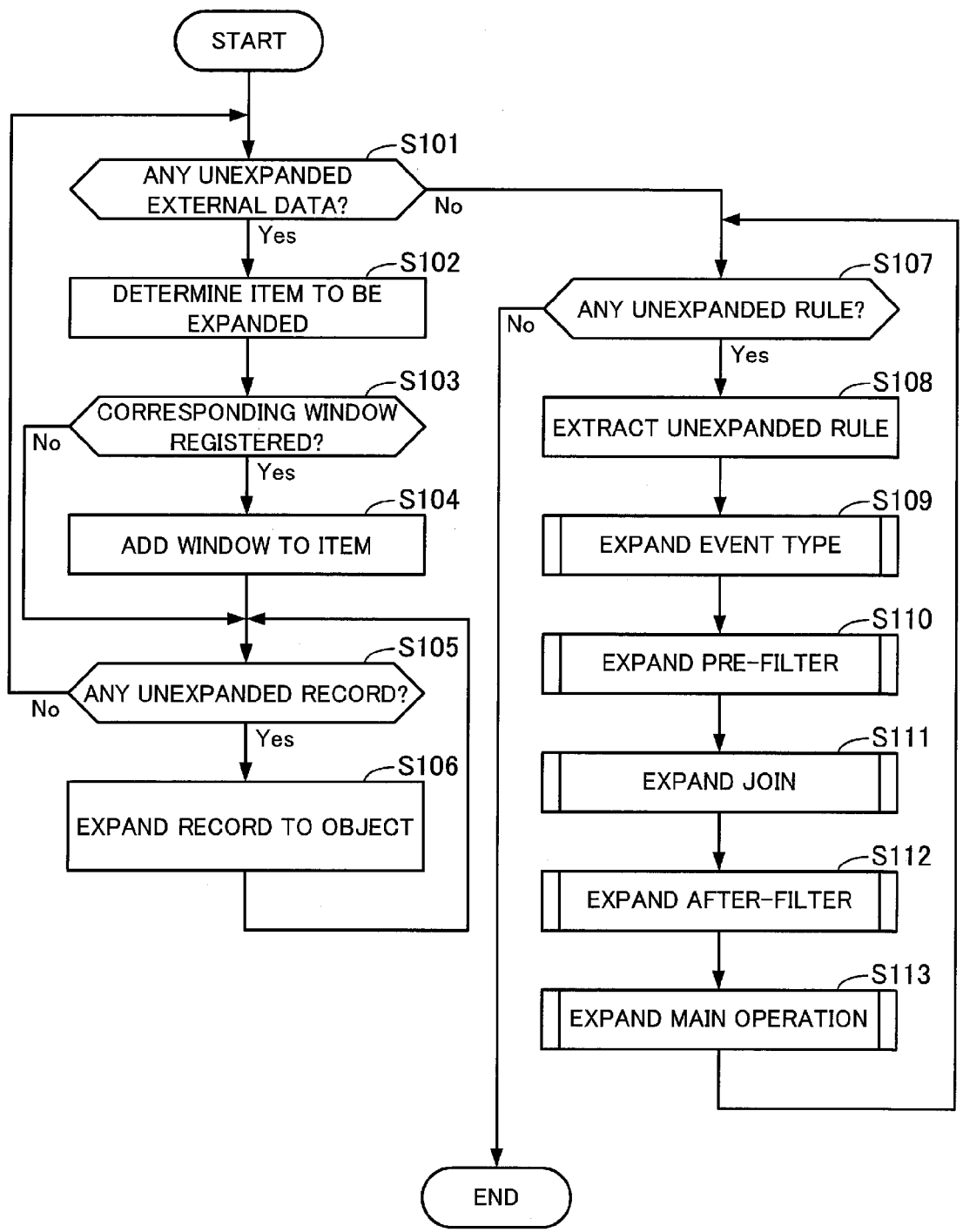
FIG. 27 is a flowchart illustrating an example of expanding rules according to the third embodiment.

FIG. 27 is a flowchart illustrating an example of expanding rules according to the third embodiment. In the following, the process illustrated in FIG. 27 will be described in order of step number.

(Step S101) The allocating unit 120 refers to the storage unit 110, and determines whether there is external data that is not expanded in the RAM 102. For example, the allocating unit 120 determines whether external data is not expanded, in units of tables. If there is any unexpanded external data, the process proceeds to step S102. If there is no unexpanded external data, in other words, if all the external data has been expanded, the process proceeds to step S107.

(Step S102) The allocating unit 120 determines items to be expanded, based on the control table 114a stored in the storage unit 110. For example, the home table 111 is selected as the unexpanded external data. In this case, it is found from the item "JOIN" in the control table 114a that the items used in the home table 111 are the "Home.id", "Home.maxpow", "Home.aircon", and "Home.power". Accordingly, the allocating unit 120 adds these items to the external data object.

(Step S103) The allocating unit 120 refers to the control table 114a, and determines whether a window corresponding to the external data is registered. If there is such a window, the process proceeds to step S104. If there is not such a window, the process proceeds to step S105. More specifically, it is found from the "Status (Window)" item of the control table 114a, that a window "Home.pow" is registered. In this case, the allocating unit 120 determines that there is the window "Home.pow" corresponding to the home table 111.

(Step S104) The allocating unit 120 adds the item related to the window to the items of the external data object. For example, the allocating unit 120 adds the item related to the window "Home.pow" to the external data object of the home table 111.

(Step S105) The allocating unit 120 refers to the external data, and determines whether there is any unexpanded record. If there is an unexpanded record, the process proceeds to step S106. If there is no unexpanded record, the process returns to step S101.

(Step S106) The allocating unit 120 expands an unexpanded record in the external data, as an external data object having the items determined in step S102 and the window determined in step S104 in the RAM 102. Then, the process returns to step S105.

(Step S107) The allocating unit 120 refers to the control table 114a, and determines whether there is any unexpanded rule. If there is an unexpanded rule, the process proceeds to step S108. If there is no unexpanded rule, that is, if all the rules included in the control table 114a have been expanded, the process ends.

(Step S108) The allocating unit 120 extracts an unexpanded rule. The unexpanded rule extracted in step S108 is hereinafter referred to simply as an "extracted rule".

(Step S109) The allocating unit 120 expands an event type corresponding to the extracted rule to a rule structure.

(Step S110) The allocating unit 120 expands a pre-filter included in the extracted rule to a rule structure.

(Step S111) The allocating unit 120 expands a JOIN included in the extracted rule to a rule structure.

(Step S112) The allocating unit 120 expands an after-filter included in the extracted rule to a rule structure.

(Step S113) The allocating unit 120 expands a main operation included in the extracted rule to a rule structure.

In this way, the allocating unit 120 expands external data to external data objects. Further, the allocating unit 120 expands each rule in the control table 114a to a rule structure. The following describes the method of expanding to rule structures in step S109 through 5113 in detail. First, a method of expanding an event type to a rule structure in step S109 will be described.

Figure 28:
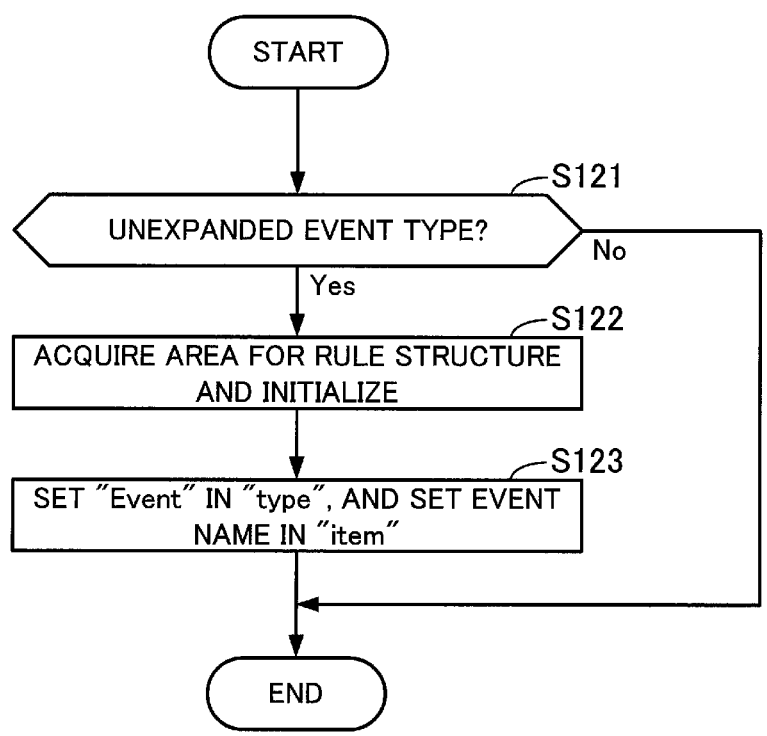
FIG. 28 is a flowchart illustrating an example of expanding an event type according to the third embodiment.

FIG. 28 is a flowchart illustrating an example of expanding an event type according to the third embodiment. In the following, the process illustrated in FIG. 28 will be described in order of step number.

(Step S121) The allocating unit 120 determines whether the event type corresponding to the extracted rule is an event type that has not been expanded to a rule structure. If the event type has not been expanded, the process proceeds to step S122. If the event type has been expanded, the process ends.

(Step S122) The allocating unit 120 acquires an area for a rule structure from the RAM 102, and initializes the settings of the area (for example, sets "0" in the "rule").

(Step S123) The allocating unit 120 sets "Event" in the "type" of the rule structure, and sets the event name (the event type) in the "item".

In this way, the allocating unit 120 creates the rule structures 511 and 512 of the event type. Note that the determination of step S121 is performed for the following reason.

For example, in the case of expanding the rule r3 to a rule structure after expanding the rule r2 to a rule structure, the rule structure 512 for the event type "A" has been already created before expanding the rule r3. In this case, the allocating unit 120 avoids creating the rule structure 512 again.

The following describes a method of expanding a pre-filter to a rule structure in step S110 of FIG. 27.

Figure 29:
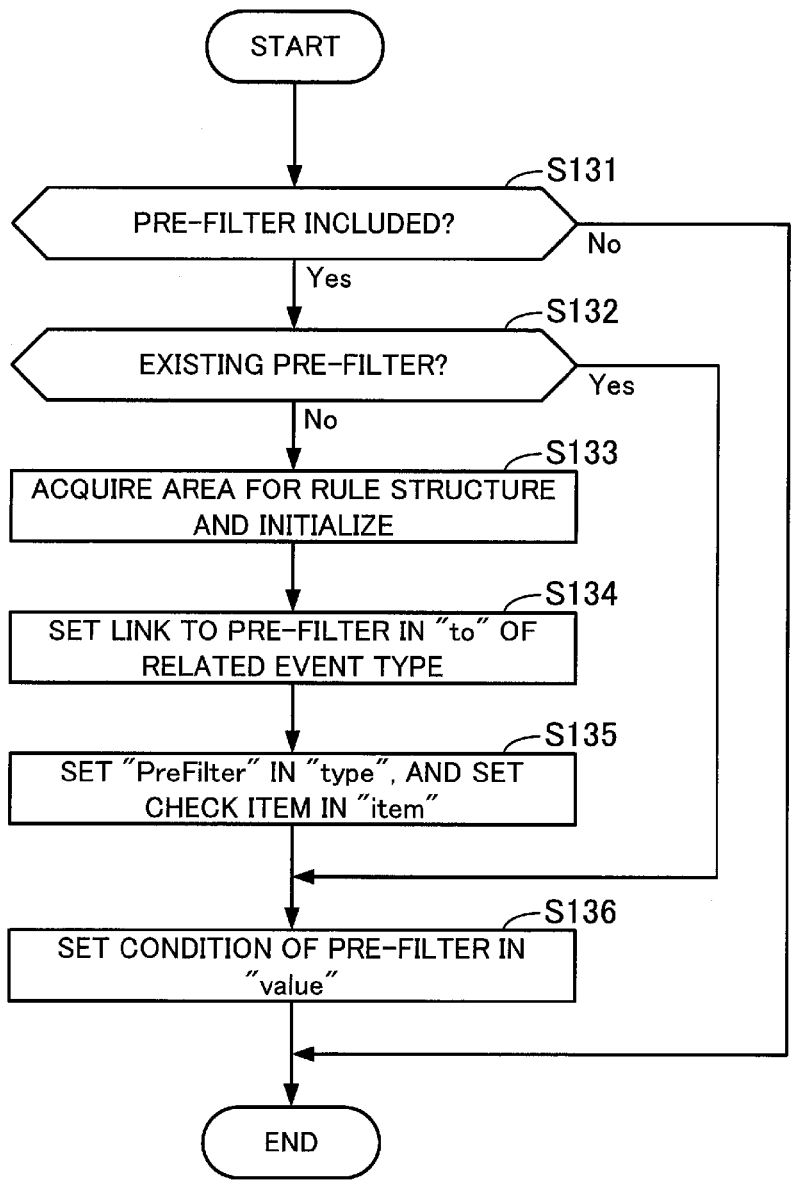
FIG. 29 is a flowchart illustrating an example of expanding a pre-filter according to the third embodiment.

FIG. 29 is a flowchart illustrating an example of expanding a pre-filter according to the third embodiment. In the following, the process illustrated in FIG. 29 will be described in order of step number.

(Step S131) The allocating unit 120 refers to the control table 114a stored in the storage unit 110, and determines whether information indicating a pre-filter is set in the extracted rule. If information indicating a pre-filter is set, the process proceeds to step S132. If information indicating a pre-filter is not set, the process ends.

(Step S132) The allocating unit 120 determines whether the pre-filter is an existing pre-filter. Being an existing pre-filter means that the per-filter has been expanded to a rule structure. If the pre-filter is not an existing pre-filter, the process proceeds to step S133. If the pre-filter is an existing pre-filter, the process proceeds to step S136. The allocating unit 120 determines whether the pre-filter is an existing pre-filter, based on the value of the "item" that is set in the rule structure of the expanded event type and the value of the "item" that is set in the rule structure of the expanded pre-filter to which the rule structure of this event type is linked. For example, if the rule r2 has been expanded, the rule structure 522 has been created. Thus, a link between the rule structure 512 and the rule structure 522 has been created. In this situation, when expanding the rule r3, the rule structure 522 for the same check item ".temp" as that of the pre-filter of the rule r3 has been created for the rule structure 512 having the same event type "A" as the rule r3. Accordingly, in this case, the allocating unit 120 determines that the pre-filter included in the rule r3 is an existing pre-filter.

(Step S133) The allocating unit 120 acquires an area for a rule structure from the RAM 102, and initializes the settings of the area. For example, the number indicating the extracted rule is set in the "rule". Further, "NULL" is set in the "to". This is because, in the rule structure of the pre-filter, a link is defined in a value structure.

(Step S134) The allocating unit 120 sets a link to the rule structure of the pre-filter in the "to" of the related event type. For example, in the case of the rule r1, since the related event type is "P", a link to the rule structure 521 is set in the "to" of the rule structure 511. Further, for example, in the case of the rule r2 (or the rule r3), since the related event type is "A", a link to the rule structure 522 is set in the "to" of the rule structure 512.

(Step S135) The allocating unit 120 sets "Prefilter" in the "type" of the rule structure of the pre-filter. Further, the allocating unit 120 sets a check item in the "item".

(Step S136) The allocating unit 120 sets the content of the condition determination of the pre-filter in the value structure. Here, in the case where step S136 is executed after the pre-filter is determined to be an existing filter in step S132, the allocating unit 120 sets "0" in the "rule" of the corresponding rule structure. This is because the rule structure may be used by multiple rules. Note that in the case of setting the content of a new condition determination in the value structure, the allocating unit 120 acquires an area for the value structure from the RAM 102, and initializes the area. Then, the allocating unit 120 sets the content of the condition determination.

In this way, the allocating unit 120 creates the rule structures 521 and 522 of the pre-filter. Note that, by performing the determination of step S132, it is possible to prevent two rule structures from being created for the same check item of the same event type. Accordingly, it is possible to save the space of the RAM 102.

Further, in step S136, in the case of newly setting the content of a condition determination, the content of another condition determination that has been set in a value structure is taken into consideration. For example, as for the rule r2, in the case where the rule structure 522 has already been created, the condition determination ".temp>25" of the pre-filter has already been set. In this situation, even if the condition determination ".temp>20 & temp<=25" of the pre-filter is set for the rule r3, the pre-filter does not overlap the condition determination of the rule r2. Accordingly, the allocating unit 120 newly acquires an area of a value structure from the RAM 102 for the pre-filter of the rule r3, and sets the condition ".temp>20 & temp<=25".

The following describes a method of expanding a JOIN key to a rule structure in step S111 of FIG. 27.

Figure 30:
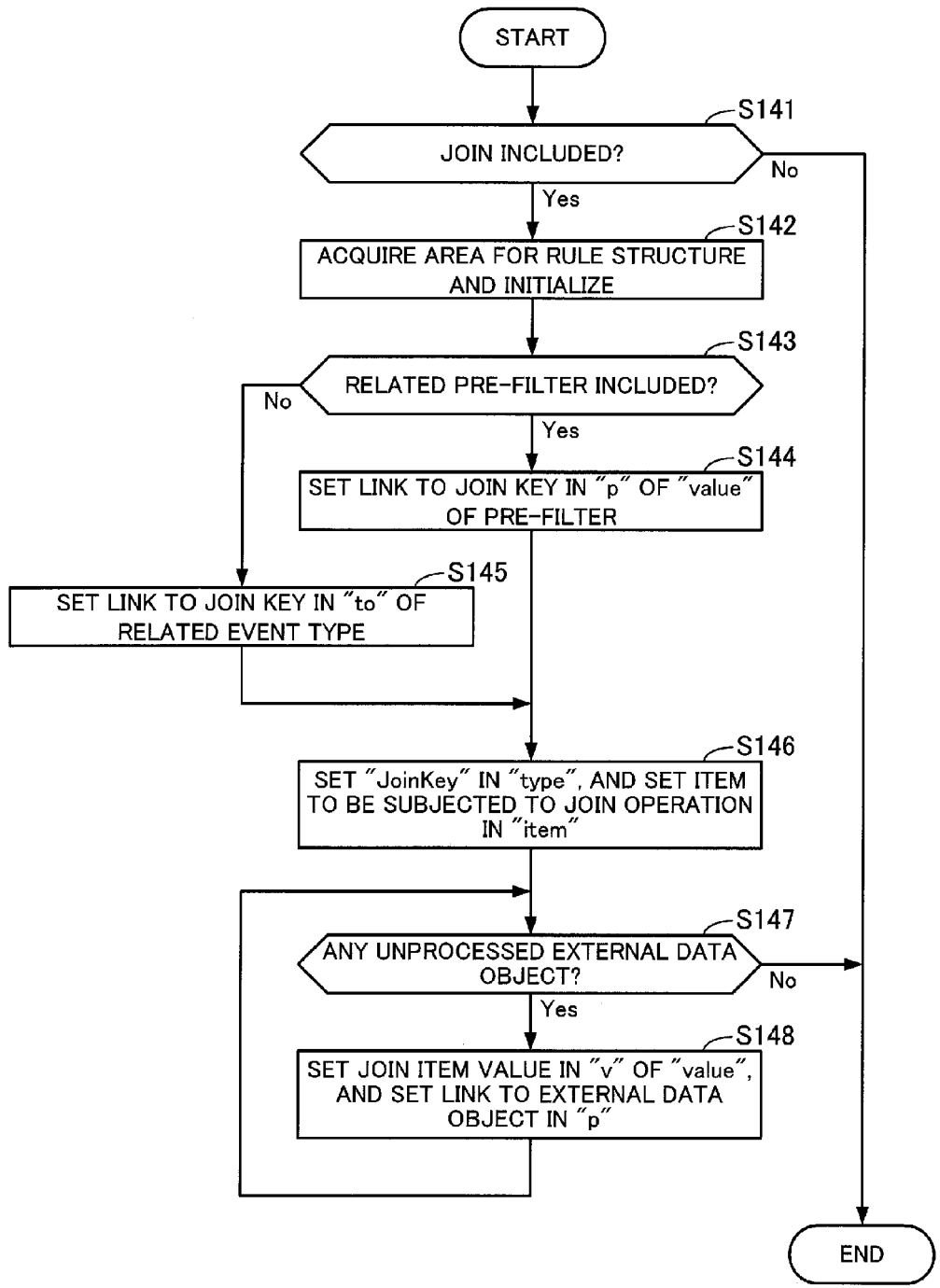
FIG. 30 is a flowchart illustrating an example of expanding a JOIN key according to the third embodiment.

FIG. 30 is a flowchart illustrating an example of expanding a JOIN key according to the third embodiment. In the following, the process illustrated in FIG. 30 will be described in order of step number.

(Step S141) The allocating unit 120 refers to the control table 114*a* stored in the storage unit 110, and determines whether information indicating a JOIN operation is set in the extracted rule. If information indicating a JOIN operation is set, the process proceeds to step S142. If information indicating a JOIN operation is not set, the process ends.

(Step S142) The allocating unit 120 acquires an area for a rule structure from the RAM 102, and initializes the settings of the area. For example, the number indicating the extracted rule is set in the "rule".

(Step S143) The allocating unit 120 determines whether a pre-filter is included in the extracted rule. If a pre-filter is included, the process proceeds to step S144. If a pre-filter is not included, the process proceeds to step S145.

(Step S144) The allocating unit 120 sets a link to the rule structure (JOIN key) created in step S142 as the "p" value of a value structure of the corresponding pre-filter. For example, as for the rule structure 531 of the JOIN key, the allocating unit 120 sets "1006:0000" as the "p" value of a value structure corresponding to the rule structure 521 of the pre-filter. The "p" value is the link L2 to the rule structure 531.

(Step S145) The allocating unit 120 sets a link to the rule structure (JOIN key) created in step S142 in the "to" of a rule structure of the event type corresponding to the extracted rule.

(Step S146) The allocating unit 120 sets "JoinKey" in the "type" of the rule structure created in step S142, and sets an item to be subjected to a JOIN in the "item". For example, in the case of the rule r1, the item included in the event record and to be subjected to a JOIN is "P.id". Accordingly, ".id" is registered in the "item".

(Step S147) The allocating unit 120 determines whether there is any unprocessed external data object that has not undergone the operation of step S148 described below. If there is any unprocessed external data object, the process proceeds to step S148. If there is no unprocessed external data object, the process ends.

(Step S148) The allocating unit 120 acquires an area for a value structure for the newly created rule structure from the RAM 102, and initializes the area. Then, the allocating unit 120 sets, as the "v" value, a value that the item to be subjected to a JOIN may take. Further, the allocating unit 120 sets a link to an external data object corresponding to the "p" value. For example, as for the rule r1, the values that the item "P.id" to be subjected to a JOIN may take are "0011" and "0012". Accordingly, the allocating unit 120 sets these two values as "v" values of value structures corresponding to the rule structure 531. The external data object including "0011" in the "Home.power" corresponding to the "P.id" is the external data object 601. Accordingly, the allocating unit 120 sets "1001:0000" as the "p" value corresponding to "0011" of the "v" value. This is the link L3 to the external data object 601. Likewise, the allocating unit 120 sets "1002:0000" as the "p" value corresponding to "0012" of the "v" value. This is the link L4 to the external data object 602. Then, the process returns to step S147.

In this way, the allocating unit 120 creates the rule structures 531 and 532 of the JOIN key.

The following describes a method of expanding an after-filter to a rule structure in step S112 of FIG. 27.

Figure 31:
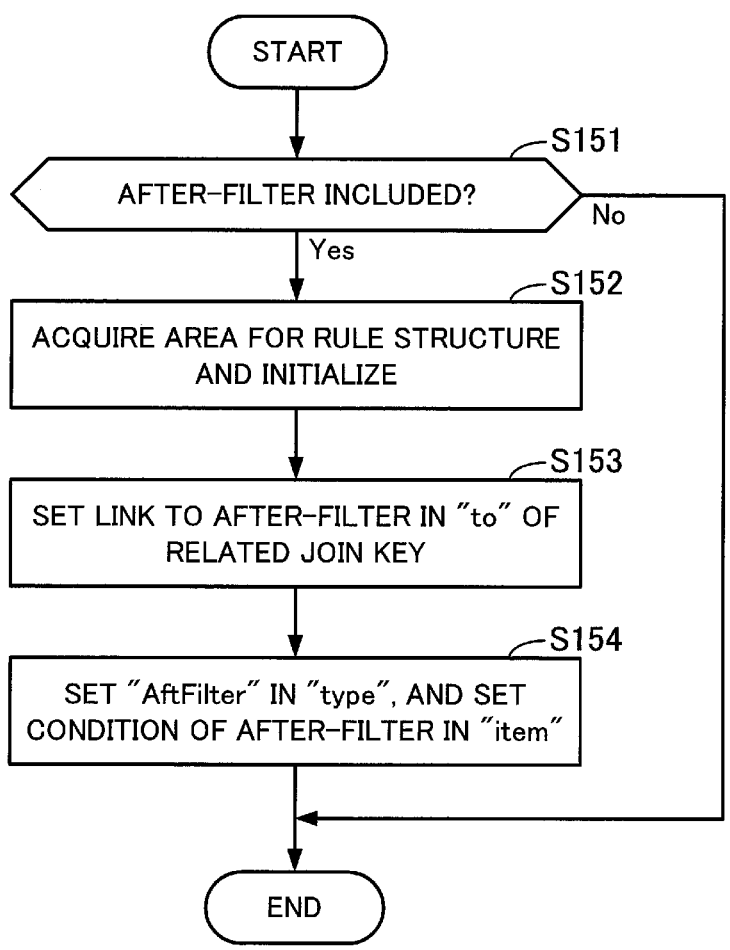
FIG. 31 is a flowchart illustrating an example of expanding an after-filter according to the third embodiment.

FIG. 31 is a flowchart illustrating an example of expanding an after-filter according to the third embodiment. In the following, the process illustrated in FIG. 31 will be described in order of step number.

(Step S151) The allocating unit 120 refers to the control table 114*a* stored in the storage unit 110, and determines whether information indicating an after-filter is set in the extracted rule. If information indicating an after-filter is set, the process proceeds to step S152. If information indicating an after-filter is not set, the process ends.

(Step S152) The allocating unit 120 acquires an area for a rule structure from the RAM 102, and initializes the settings of the area. For example, the number indicating the extracted rule is set in the "rule".

(Step S153) The allocating unit 120 sets a link to the rule structure created in step S152 in the "to" of a rule structure of the related JOIN key. For example, as for the rule structure 541 of the after-filter, the allocating unit 120 sets "1009:0000" in the "to" of the rule structure 532 of the JOIN key. The "to" value is the link L31 to the rule structure 541.

(Step S154) The allocating unit 120 sets "AftFilter" in the "type" of the rule structure created in step S152, and sets the content of the condition determination of the after-filter in the "item".

In this way, the allocating unit 120 creates the rule structure 541 of the after-filter.

The following describes a method of expanding a main operation to a rule structure in step S113 of FIG. 27.

Figure 32:
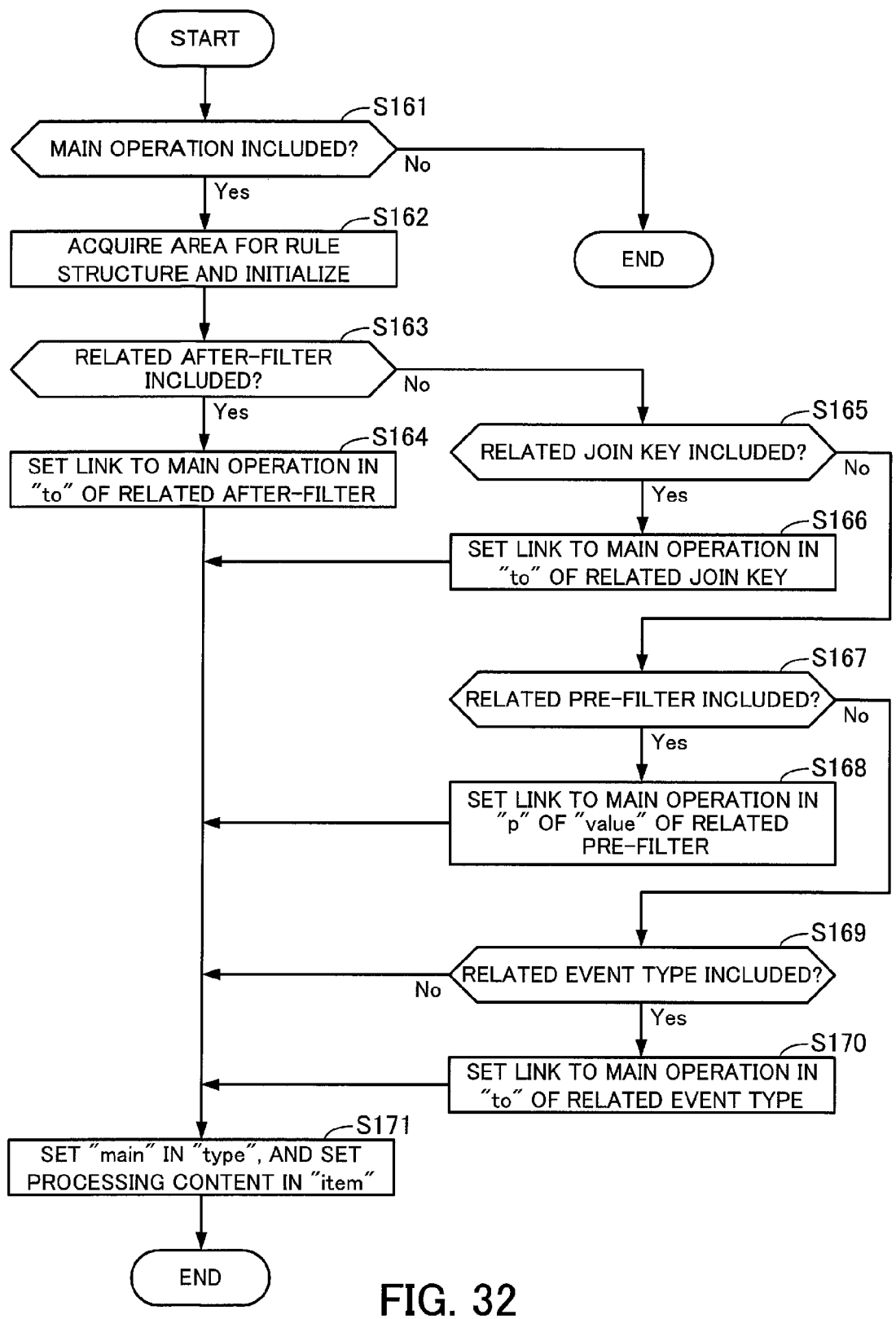
FIG. 32 is a flowchart illustrating an example of expanding a main operation according to the third embodiment.

FIG. 32 is a flowchart illustrating an example of expanding a main operation according to the third embodiment. In the following, the process illustrated in FIG. 32 will be described in order of step number.

(Step S161) The allocating unit 120 refers to the control table 114*a* stored in the storage unit 110, and determines whether information indicating a main operation is set in the extracted rule. If information indicating a main operation is set, the process proceeds to step S162. If information indicating a main operation is not set, the process ends.

(Step S162) The allocating unit 120 acquires an area for a rule structure from the RAM 102, and initializes the settings of the area. For example, the number indicating the extracted rule is set in the "rule". Further, for example, "NULL" is set in the "to".

(Step S163) The allocating unit 120 determines whether an after-filter is included in the extracted rule. If an after-filter is included, the process proceeds to step S164. If an after-filter is not included, the process proceeds to step S165.

(Step S164) The allocating unit 120 sets a link to the rule structure (main operation) created in step S162 in the "to" of the corresponding after-filter. For example, as for the rule structure 552 of the main operation, the allocating unit 120 sets "1010:0000" in the "to" of the rule structure 541 of the after-filter. This is the link L34 to the rule structure 552. Then, the process proceeds to step S171.

(Step S165) The allocating unit 120 determines whether a JOIN key is included in the extracted rule. If a JOIN key is included, the process proceeds to step S166. If a JOIN key is not included, the process proceeds to step S167.

(Step S166) The allocating unit 120 sets a link to the rule structure (main operation) created in step S162 in the "to" of the corresponding JOIN key. For example, as for the rule structure 551 of the main operation, the allocating unit 120 sets "1008:0000" in the "to" of the rule structure 531 of the JOIN key. This is the link L5 to the rule structure 551. Then, the process proceeds to step S171.

(Step S167) The allocating unit 120 determines whether a pre-filter is included in the extracted rule. If a pre-filter is included, the process proceeds to step S168. If a pre-filter is not included, the process proceeds to step S169.

(Step S168) The allocating unit 120 sets a link to the rule structure (main operation) created in step S162 as the value of a value structure of the corresponding pre-filter. For example, as for the rule structure 553 of the main operation, the allocating unit 120 sets "1011:0000" as the second "p" value of a value structure corresponding to the rule structure 522 of the pre-filter. This is the link L20 to the rule structure 553. Then, the process proceeds to step S171.

(Step S169) The allocating unit 120 determines whether a related event type is included in the extracted rule. If a related event type is included, the process proceeds to step S170. If a related event type is not included, the process proceeds to step S171.

(Step S170) The allocating unit 120 sets a link to the rule structure (main operation) created in step S162 in the "to" of the rule structure of the related event type.

(Step S171) The allocating unit 120 sets "main" in the "type" of the rule structure created in step S162, and sets the content of the main operation in the "item".

In this way, the allocating unit 120 creates the rule structures 551, 552, and 553 of the main operation.

Next, a description will be given of the procedure of event processing according to the third embodiment. The event processing of the third embodiment differs from the event processing of the second embodiment in that the event processing is performed while referring to rule structures by following the links. The server 100 performs the following process in place of step S15 of FIG. 15.

Figure 33:
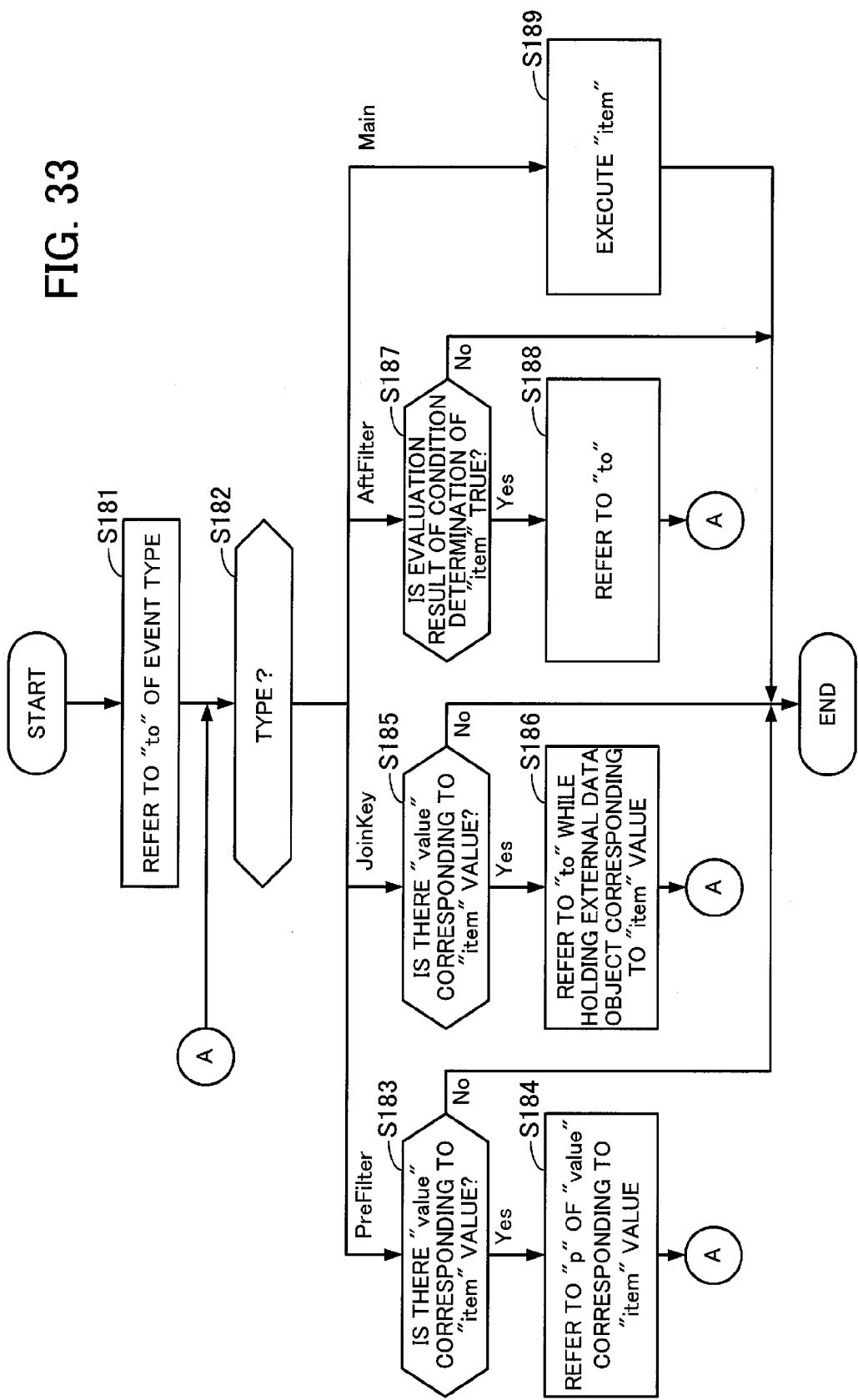
FIG. 33 is a flowchart illustrating an example of event processing according to the third embodiment.

FIG. 33 is a flowchart illustrating an example of event processing according to the third embodiment. In the following, the process illustrated in FIG. 33 will be described in order of step number.

(Step S181) The processing unit 130 obtains an event type of the received event record. The processing unit 130 obtains a pointer from the "to" of the rule structure of the event type. The processing unit 130 refers to the next rule structure indicated by the pointer.

(Step S182) The processing unit 130 determines the "type" of the rule structure that is referred to. If the "type" is "Pre-Filter", the process proceeds to step S183. If the "type" is "JoinKey", the process proceeds to step S185. If the "type" is "AftFilter", the process proceeds to step S187. If the "type" is "Main", the process proceeds to step S189.

(Step S183) The processing unit 130 obtains the value (event value) of the event record for the item specified in the "item" of the rule structure (pre-filter), and determines whether there is a value structure (value) corresponding to the event value. If there is a value structure corresponding to the event value specified in the "item", the process proceeds to step S184 (an event that has passed through the pre-filter). If there is no value structure corresponding to the event value specified in the "item", the processing for the event record ends (an event removed by the pre-filter). The processing unit 130 is able to determine whether there is a value structure corresponding to the event value, by comparing the event value with the "v" value of the value structure corresponding to the rule structure. For example, it is assumed that the event record 210 is received. The item specified in the "item" of the rule structure 521 is ".pow". The "v" value of a value structure corresponding to the rule structure 521 is ">500". The "pow" value of the event record 210 is "1510", which satisfies "1510>500". In this case, the processing unit 130 determines that there is a value structure corresponding to the event value specified in the "item". On the other hand, if the event value does not satisfies the content of the condition determination indicated by the "v" value, there is no value structure corresponding to the event value specified in the "item".

(Step S184) The processing unit 130 obtains a pointer from the "p" value of a value structure corresponding to the value of the "item" of the rule structure (pre-filter). The processing unit 130 refers to the next rule structure indicated by the pointer. For example, as for the rule structure 521, if the event value satisfies ">500" of the "v" value, then "1006:0000" of the "p" value (pointer) corresponding to the "v" value is obtained. This is the link L2 to the rule structure 531. The processing unit 130 refers to the rule structure 531 by following the link L2. Then, the process returns to step S182.

(Step S185) The processing unit 130 obtains the event value for the item specified in the "item" of the rule structure (JOIN key), and determines whether there is a value structure corresponding to the event value. If there is a value structure corresponding to the event value specified in the "item", the process proceeds to step S186 (a valid event including an item to be subjected to a JOIN). If there is no value structure corresponding to the event value specified in the "item", the processing for the event record ends (an invalid event not including an item to be subjected to a JOIN). For example, it is assumed that the event record 210 is received. The item specified in the "item" of the rule structure 531 is ".id[2]". The "v" values of value structures corresponding to the rule structure 531 are "0011" and "0012". The "id" value of the event record 210 is "0011", which matches "0011" of the "v" value. In this case, the processing unit 130 determines that there is a value structure corresponding to the event value specified in the "item". On the other hand, if the event value does not match any "v" value, the processing unit 130 determines that there is no value structure corresponding to the event value specified in the "item" (an invalid event not including an item to be subjected to a JOIN).

(Step S186) The processing unit 130 obtains a pointer to an external data object from the "p" value of a value structure corresponding to the value of the "item" of the rule structure (JOIN key). The processing unit 130 obtains a pointer from the "to" of the rule structure. The processing unit 130 refers to the next rule structure indicated by pointer obtained from the "to", while holding the pointer to the external data object. For example, as for the rule structure 531, if the event value (P.id)=the "v" value="0011", then "1001:0000" of the "p" value (pointer) corresponding to the "v" value is obtained. This is the link L3 to the external data object 601. Further, the processing unit 130 obtains "1008:0000" of the "to" (pointer) of the rule structure 531. This is the link L5 to the rule structure 551. The processing unit 130 refers to the rule structure 551 by following the link L5, while holding the pointer to the external data object 601. Then, the process returns to step S182.

(Step S187) The processing unit 130 determines whether the evaluation result of the condition determination specified by the "item" of the rule structure (after-filter) is true. If the evaluation result is true, the process proceeds to step S188 (an event that has passed through the after-filter). If the evaluation result is false, the process ends (an event removed by the after-filter). For example, as for the rule structure 541, the condition determination that is set in the "item" is "Home.pow>Home.maxpow". In this case, the rule structure 541 is referred to by the rule structure 531 (JOIN key), and a link to an external data object is held. For example, in the case where the event record 310 is received, a link to the external data object 601 is held. Further, in the external data object 601, the values of "Home.pow" and "Home.maxpow" are set.

Accordingly, the processing unit 130 is able to perform the condition determination by reading the values from the external data object 601. Taking the external data object 601 as an example, since "Home.pow=1510">"Home.maxpow= 1500", the evaluation result of the condition determination is true.

(Step S188) The processing unit 130 obtains a pointer from the "to" of the rule structure (after-filter). The processing unit 130 refers to the next rule structure indicated by the pointer. Then, the process returns to step S182.

(Step S189) The processing unit 130 executes an operation that is set in the "item" of the rule structure (main operation). For example, as for the rule structure 551, the content of the operation that is set in the "item" is "Set Home.pow=P.pow". In this case, the rule structure 551 is referred to by the rule structure 531 (JOIN key), and a link to an external data object is held. For example, in the case where the event record 210 is received, the link to the external data object 601 is held. Further, the external data object 601 includes the item "Home.pow". Accordingly, the processing unit 130 is able to set "pow=1510", which is stored in the event record 210, in the "Home.pow" of the external data object. Similarly, in the case of the rule structures 552 and 553, the processing unit 130 executes the content of the operation that is set in the "item". However, the rule structures 552 and 553 are executable without referring to an external data object.

In this way, the processing unit 130 performs event processing by sequentially following the rule structures expanded in the RAM 102.

Figure 34:
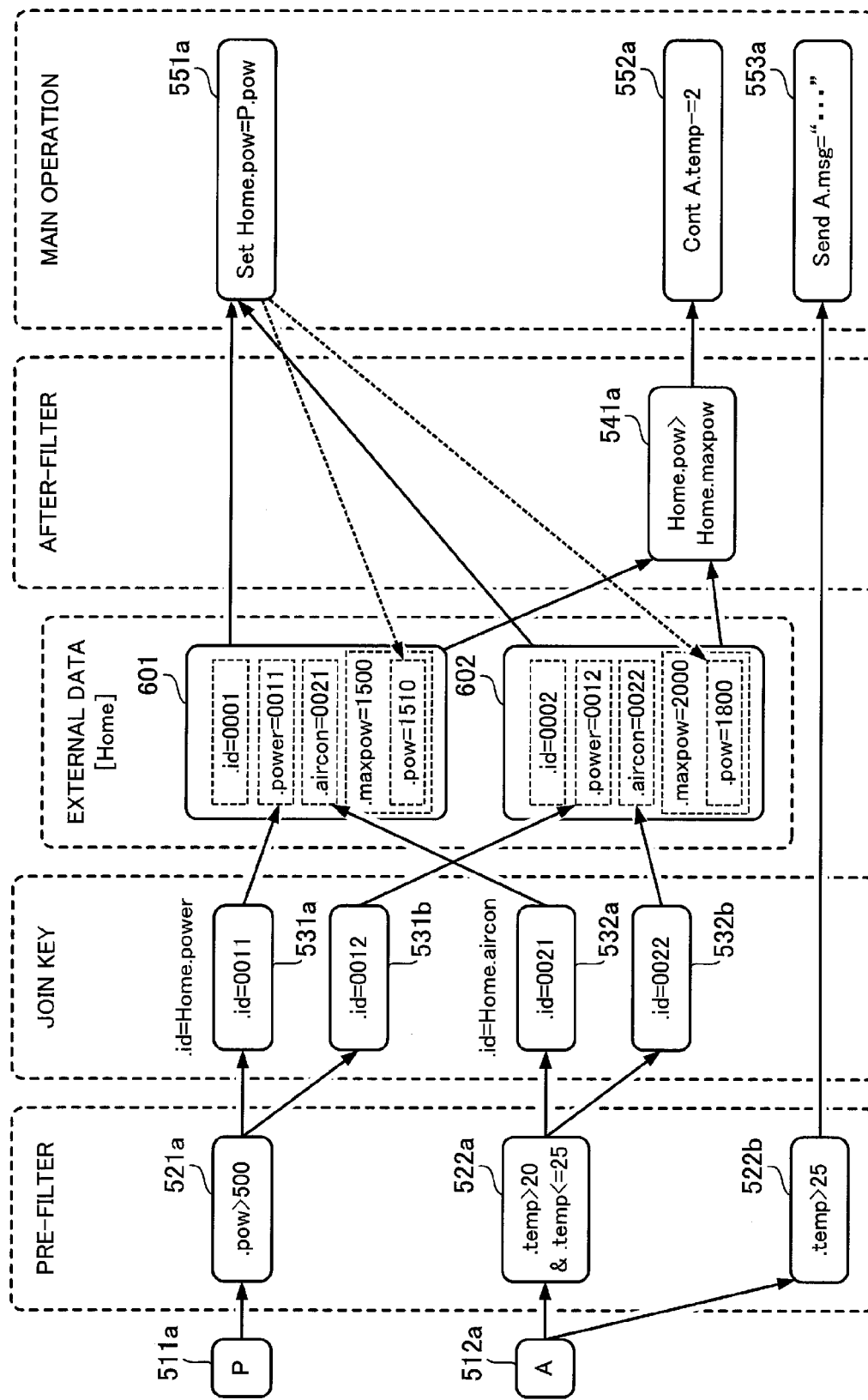
FIG. 34 illustrates an example of event processing according to the third embodiment.

FIG. 34 illustrates an example of event processing according to the third embodiment. In FIG. 34, the value of the "item" of each rule structure of FIG. 26 is depicted. For example, an item 511*a* is "P", which is the "item" value of the rule structure 511. An item 512*a* is "A", which is the "item" value of the rule structure 512. An item 541*a* is "Home.pow>Home.maxpow", which is the "item" value of the rule structure 541. An item 551*a* is "Set Home.pow=P.pow", which is the "item" value of the rule structure 551. An item 552*a* is "Cont A.temp -=2", which is the "item" value of the rule structure 552. An item 553*a* is "Send A.msg=" . . . "", which is the "item" value of the rule structure 553.

Further, in the case where the "v" value of a value structure exists for the "item" value, a combination of the "item" value and the "v" is illustrated (this combination is also referred to as an "item"). For example, an item 521*a* is ".pow>500", which is a combination of the "item" value and the "v" value of the rule structure 521.

Further, in the case where two "v" values exist for the "item" value of a single rule structure, a combination of the "item" value and each of the "v" values is illustrated.

For example, an item 522*a* is ".temp>20 & .temp<=25", which is a combination of the "item" value and the first "v" value of the rule structure 522. For example, an item 522*b* is ".temp>25", which is a combination of the "item" value and the second "v" value of the rule structure 522.

An item 531*a* is ".id=0011", which is a combination of the "item" value and the first "v" value of the rule structure 531. An item 531*b* is ".id=0012", which is a combination of the "item" value and the second "v" value of the rule structure 531.

An item 532*a* is a combination of the "item" value and the first "v" value of the rule structure 532, which is ".id=0021". An item 532*b* is ".id=0022", which is a combination of the "item" value and the second "v" value of the rule structure 532.

The processing unit 130 performs event processing by processing each "item" while following the links between rule structures. For example, it is assumed that the event record 210 is received from the power consumption meter 50. In this case, the processing unit 130 executes processing corresponding to the rule r1 in the following way.

(1) The event type of the event record 210 is "P", which corresponds to the item 511*a* of the rule structure 511. Accordingly, the processing unit 130 refers to the next rule structure 521.

(2) In the event record 210, "P.pow"=1510">"500", and there is the corresponding item 521*a* in the rule structure 521. Accordingly, the processing unit 130 refers to the next rule structure 531.

(3) In the event record 210, "P.id"=0011", and there is the corresponding item 531*a* in the rule structure 531. Accordingly, the processing unit 130 holds the link to the external data object 601, and refers to the next rule structure 551.

(4) The processing unit 130 executes an operation of the item 551*a* of the rule structure 551. At this point, the link to the external data object 601 has been held. Further, in the event record 210, "P.pow=1510". Accordingly, the processing unit 130 sets "1510" in the item ".pow" of the external data object 601 corresponding to the window (in FIG. 34, setting operations are indicated by the dotted line.)

Thus, processing of the rule r1 for the event record 210 ends. Note that, FIG. 34 also illustrates the line indicating the relationship between items that are associated using the same procedure as described above in the case where an event record of: the event type "P"; "P.id=0012"; and "P.pow=1800" is received.

It is assumed that thereafter, the event record 310 is received from the air conditioner 60. In this case, the processing unit 130 executes processing corresponding to the rules r2 and r3 in the following way.

(1) The event type of the event record 310 is "A", which corresponds to the item 512*a* of the rule structure 512. Accordingly, the processing unit 130 refers to the next rule structure 522.

(2) In the event record 310, "A.temp"=22", and there is the corresponding item 522*a* in the rule structure 522. Accordingly, the processing unit 130 refers to the next rule structure 532. Note that the item 522*b* does not correspond to "A.temp=22", the processing unit 130 does not refer to the rule structure 553. That is, the processing of the rule r2 ends at the pre-filter.

(3) In the event record 310, "A.id"=0021", and there is the corresponding item 532*a* in the rule structure 532. Accordingly, the processing unit 130 holds the link to the external data object 601, and refers to the next rule structure 541.

(4) The processing unit 130 evaluates a condition determination of the item 541*a* of the rule structure 541. At this point, the link to the external data object 601 has been held. Thus, the processing unit 130 obtains "Home.pow=1510" and "Home.maxpow=1500" from the external data object 601, and evaluates the item 541*a*. In this case, the evaluation result of the item 541*a* is true. Accordingly, the processing unit 130 refers to the next rule structure 552.

(5) The processing unit 130 executes an operation of the item 552*a* of the rule structure 552. By executing this operation, the processing unit 130 generates the event record 310, and transmits the event record 310 to the air conditioner 60. Upon receiving the event record 310, the air conditioner 60 lowers the temperature setting by 2° C. in accordance with the instruction of the event record 310.

Thus, processing of the rule r3 for the event record 310 ends. Note that, FIG. 34 also illustrates the line indicating the relationship between items that are associated using the same procedure as described above in the case where an event record of the event type "A" and "A.id=0022" is received.

In this way, in the third embodiment, the external data and the control table 114a are expanded as rule structures in the RAM 102, and event processing is performed based on the rule structures. Thus, when performing event processing, it is possible to obtain information corresponding to the result of a JOIN operation by referring to the rule structures. That is, there is no need to perform a JOIN operation at the time of event processing. This enables further acceleration of event processing.

Since the control table 114a obtained by optimizing the control table 114 is expanded as rule structures, there is no need to hold needless information in the RAM 102. It is therefore possible to not only save the space of the RAM 102, but also eliminate the need to follow the links to the rule structures. Thus, the performance of the processing unit 130 may be improved. Further, the same check item for the same event type is managed by the same rule structure, and only the differences such as specific values and the like are managed by value structures. It is therefore possible to not only reduce the number of rule structures and save the space of the RAM 102, but also check multiple rules all at once. Thus, the performance of the processing unit 130 may be improved.

Further, in the third embodiment, the window (variable) corresponding to the external data is held together with the external data expanded in the RAM 102, and thus may be used together with rules and the external data from a rule (using a common pointer). Therefore, it is possible to efficiently make a determination based on the interaction between multiple events in the preceding stage (filter) of the main operation. This allows the filter unit to perform part of complex event processing (window processing corresponding to the external data), which is conventionally performed by a main operation unit, at high speed.

The functions described above may be realized by causing a computer to perform a predetermined program. The program may be recorded in the computer-readable portable storage medium 13. For distributing the program, the program may be stored in the storage medium 13 and distributed, for example. The program may also be stored in a server computer, and transmitted to the computer via a network. The computer may store the program recorded in the storage medium 13 or the program acquired from the network in its non-volatile storage medium. Then, the computer reads and executes the program from the non-volatile storage medium. However, instead of storing the acquired program in the non-volatile storage medium, the computer may load the acquired program into the RAM and executes the program when needed. The program of the present invention is executed by a processor such as the CPU of the computer.

According to an embodiment, it is possible to process events efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention.

Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein an event processing program that causes a computer to perform a process comprising:
   searching rule information that includes information indicating a plurality of operations that is started according to types of events indicated in event data, to find information indicating a first operation that is started for event data of a first type, information indicating an operation of a condition determination that is executable using the event data regardless of a result of the first operation and that is started after the first operation is executed, and information indicating a second operation whose execution is determined depending on a result of the condition determination and which uses the result of the first operation;
   generating, for the first type, control information for controlling an execution order of the operations such that execution of the first operation is determined depending on a result of the condition determination and such that the second operation is started after the first operation is executed; and
   executing, when the event data of the first type is input, the operations corresponding to the input event data, based on the control information.

2. The non-transitory computer-readable storage medium according to claim 1, wherein the first operation includes an operation of obtaining a record from relationship data including a plurality of records in which a plurality of items are defined, based on the input event data of the first type.

3. The non-transitory computer-readable storage medium according to claim 2, wherein:
   the event data includes a record in which a plurality of items are defined; and
   the operation of obtaining a record from relationship data includes an operation of joining the input event data of the first type and the relationship data, using one or more of the items of the input event data and one or more of the items of the relationship data.

4. The non-transitory computer-readable storage medium according to claim 1, wherein the second operation includes an operation of another condition determination that uses the result of the first operation.

5. The non-transitory computer-readable storage medium according to claim 4, wherein the process further includes
   searching the rule information to find information indicating a third operation that is executed in accordance with the result of the condition determination and a result of the other condition determination, and
   registering, in the control information, information for controlling an execution order of the operations such that the third operation is executed in accordance with the result of the other condition determination.

6. The non-transitory computer-readable storage medium according to claim 1, wherein:
   the rule information includes first rule information including the information indicating the first operation, and second rule information including the information indicating the operation of the condition determination and the information indicating the second operation; and
   the first rule information and the second rule information are allowed to be input individually.

7. The non-transitory computer-readable storage medium according to claim 1, wherein:
   the control information is generated by setting the information indicating the operation of the condition determination, the information indicating the first operation, and the information indicating the second information, in a memory, using a data structure including content of an operation and a pointer that indicates information indicating a next operation in accordance with a result of the operation; and the execution order of the operations corresponding to the input event data of the first type is controlled based on the pointer included in the control information.

8. The non-transitory computer-readable storage medium according to claim 7, wherein:

the first operation includes an operation of obtaining a record corresponding to a value included in the event data of the first type, from relationship data including a plurality of records in which a plurality of items are defined;

before generating the control information, a record that is obtained by the first operation in accordance with a value potentially included in the event data of the first type is set in advance in the memory;

when setting the information indicating the first operation in the memory using the data structure, an operation for obtaining a pointer is set as the content of the operation, the pointer indicating the record in the memory corresponding to the value potentially included in the event data of the first type; and a pointer indicating the record corresponding to the value included in the input event data of the first type is obtained as the result of the first operation, and is input to the second operation.

9. The non-transitory computer-readable storage medium according to claim 8, wherein an item of the record that is set in advance in the memory is determined, based on an item used in the second operation among the plurality of items included in the relationship data.

10. The non-transitory computer-readable storage medium according to claim 8, wherein:

together with the item included in the record of the relationship data, a variable corresponding to the record used in the second operation is set in the memory;

a value is registered in the variable in the second operation corresponding to first event data; and the value registered in the variable is used in an operation corresponding to second event data.

11. The non-transitory computer-readable storage medium according to claim 1, wherein the operation of the condition determination corresponding to the input event data of the first type is executed using a condition determining unit dedicated to condition determination operations.

12. An event processing apparatus comprising:

a memory configured to store rule information that includes information indicating a plurality of operations that is started according to types of events indicated in event data; and a processor configured to perform a process including:

searching the rule information to find information indicating a first operation that is started for event data of a first type, information indicating an operation of a condition determination that is executable using the event data regardless of a result of the first operation and that is started after the first operation is executed, and information indicating a second operation whose execution is determined depending on a result of the condition determination and which uses the result of the first operation, generating, for the first type, control information for controlling an execution order of the operations such that execution of the first operation is determined depending on a result of the condition determination and such that the second operation is started after the first operation is executed, and executing, when the event data of the first type is input, the operations corresponding to the input event data, based on the control information.

13. An event processing method comprising:

searching, by a processor, rule information that includes information indicating a plurality of operations that is started according to types of events indicated in event data, to find information indicating a first operation that is started for event data of a first type, information indicating an operation of a condition determination that is executable using the event data regardless of a result of the first operation and that is started after the first operation is executed, and information indicating a second operation whose execution is determined depending on a result of the condition determination and which uses the result of the first operation, generating, by the processor, for the first type, control information for controlling an execution order of the operations such that execution of the first operation is determined depending on a result of the condition determination and such that the second operation is started after the first operation is executed; and executing, by the processor, when the event data of the first type is input, the operations corresponding to the input event data, based on the control information.

* * * * *